US011148519B2

(12) United States Patent
Hung et al.

(10) Patent No.: US 11,148,519 B2
(45) Date of Patent: Oct. 19, 2021

(54) VEHICLE CHASSIS

(71) Applicant: National Taiwan Normal University, Taipei (TW)

(72) Inventors: Yi-Hsuan Hung, Taipei (TW); Ping-Hung Shih, Taipei (TW); Li-Fan Liu, Taipei (TW); Yi-Ya Liao, Taipei (TW); Kan-Yuan Tian, Taipei (TW)

(73) Assignee: NATIONAL TAIWAN NORMAL UNIVERSITY, Tapei (TW)

( * ) Notice: Subject to any disclaimer, the term of this patent is extended or adjusted under 35 U.S.C. 154(b) by 156 days.

(21) Appl. No.: 16/682,916

(22) Filed: Nov. 13, 2019

(65) Prior Publication Data
US 2020/0239078 A1     Jul. 30, 2020

(30) Foreign Application Priority Data

Jan. 28, 2019 (TW) ................................ 108103064
Jan. 28, 2019 (TW) ................................ 108103102

(51) Int. Cl.
*B60K 1/04*         (2019.01)
*B60L 50/60*        (2019.01)
(Continued)

(52) U.S. Cl.
CPC ............... *B60K 1/04* (2013.01); *B60L 50/66* (2019.02); *B60N 2/01* (2013.01); *B60P 1/6418* (2013.01); *B60S 9/14* (2013.01); *B62D 21/09* (2013.01); *B62D 21/12* (2013.01); *B62D 21/14* (2013.01); *H01M 50/20* (2021.01); *B60K 6/28* (2013.01); *B60K 2001/0422* (2013.01);
(Continued)

(58) Field of Classification Search
CPC .............. B60K 1/04; B60K 2001/0433; B60K 2001/0455; B60K 2001/0483; B60K 2001/0461; B60L 50/66; B60L 53/80; B62D 21/14
See application file for complete search history.

(56) References Cited

U.S. PATENT DOCUMENTS

| | | | | |
|---|---|---|---|---|
| 384,911 A * | 6/1888 | Hunter | ................. | B60L 53/80 |
| | | | | 105/51 |
| 385,727 A * | 7/1888 | Salisbury | ............ | B60L 11/1822 |
| | | | | 105/51 |
| 1,091,583 A * | 3/1914 | McGlashan | ......... | B60L 11/1822 |
| | | | | 105/51 |
| 1,138,122 A * | 5/1915 | Lambert et al. | ......... | B60K 1/04 |
| | | | | 180/68.5 |

(Continued)

FOREIGN PATENT DOCUMENTS

| | | |
|---|---|---|
| CN | 201070979 Y | 6/2008 |
| CN | 102139708 B | 8/2014 |
| CN | 204956063 U | 1/2016 |

OTHER PUBLICATIONS

Taiwanese Search Report dated Oct. 16, 2019 for Application No. 108103064, along with a English translation.

*Primary Examiner* — Frank B Vanaman
(74) *Attorney, Agent, or Firm* — Birch, Stewart, Kolasch & Birch, LLP

(57) ABSTRACT

A vehicle chassis including a vehicle frame defining an inner space and being operable to switch between a first expanded state and a collapsed state, and a loading device mounted to the inner space and removably connected to the vehicle frame. The loading device defines a first loading surface when the vehicle frame is in the first expanded state, and the loading device defines a second loading surface that is smaller than the first loading surface when the vehicle frame is in the collapsed state.

15 Claims, 25 Drawing Sheets

(51) Int. Cl.
- *B62D 21/14* (2006.01)
- *B60N 2/01* (2006.01)
- *B60P 1/64* (2006.01)
- *B60S 9/14* (2006.01)
- *B62D 21/09* (2006.01)
- *B62D 21/12* (2006.01)
- *H01M 50/20* (2021.01)
- *B60K 6/28* (2007.10)
- *B60L 53/80* (2019.01)

(52) U.S. Cl.
CPC ............... *B60K 2001/0433* (2013.01); *B60K 2001/0455* (2013.01); *B60L 53/80* (2019.02); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | | | |
|---|---|---|---|---|
| 3,821,997 | A * | 7/1974 | Sieren | B60R 16/04 180/68.5 |
| 5,760,569 | A * | 6/1998 | Chase, Jr. | H01M 50/20 320/104 |
| 8,540,272 | B1 * | 9/2013 | Vitale | B62D 21/14 280/638 |
| 2009/0008918 | A1 * | 1/2009 | Hall | B60W 10/24 280/781 |
| 2011/0017527 | A1 * | 1/2011 | Oriet | B62D 21/14 180/65.1 |
| 2012/0171552 | A1 * | 7/2012 | Lachenmeier | H01M 50/502 429/159 |

* cited by examiner

VEHICLE CHASSIS

CROSS-REFERENCE TO RELATED APPLICATION

This application claims priority of Taiwanese Patent Applications No. 108103064 and No. 108103102, both filed on Jan. 28, 2019.

FIELD

The disclosure relates to an electric vehicle, and more particularly to a chassis of an electric vehicle.

BACKGROUND

A vehicle chassis of a conventional electric vehicle is commonly manufactured to be the same as that of a traditional vehicle, such that interior room of the electric vehicle is usually fixed and nonadjustable, thereby unable to satisfy various spatial demands of a user under different circumstances. In addition, battery modules of the conventional electric vehicle are usually mounted underneath passenger seats or inside the luggage space, which are difficult to access for replacement.

SUMMARY

Therefore, an object of the present disclosure is to provide a vehicle chassis that can alleviate at least one of the drawbacks of the prior art.

According to one aspect of the present disclosure, the vehicle chassis includes a vehicle frame that defines an inner space and that is operable to switch between a first expanded state and a collapsed state, and a loading device that is mounted to the inner space and that is removably connected to the vehicle frame. The loading device defines a first loading surface when the vehicle frame is in the first expanded state, and the loading device defines a second loading surface that is smaller than the first loading surface when the vehicle frame is in the collapsed state.

According to another aspect of the present disclosure, the vehicle chassis includes a vehicle frame that defines an inner space, and a loading device that includes a plurality of first loading boxes mounted to the inner space and removably connected to said vehicle frame, and a plurality of first battery modules removably and respectively disposed in the first loading boxes. The first loading boxes are permitted to be removably coupled to each other to cooperatively define a loading surface.

According to yet another aspect of the present disclosure, the vehicle chassis includes a vehicle frame that defines an inner space, and a loading device that includes four first loading boxes mounted to the inner space and removably connected to said vehicle frame, four first battery modules removably and respectively disposed in the first loading boxes, two second loading boxes, two second battery modules removably and respectively disposed in the second loading boxes, a third loading box, and a third battery module removably disposed in the third loading box. Each of the second loading boxes is permitted to be removably coupled between corresponding two of the first loading boxes, and the third loading box is permitted to be removably coupled among the first and second loading boxes to cooperatively define a loading surface.

According to still another aspect of the present disclosure, the vehicle chassis includes a vehicle frame that defines an inner space, and a loading device that includes four first loading boxes mounted to the inner space and removably connected to said vehicle frame, four first battery modules removably and respectively disposed in the first loading boxes, two second loading boxes, and two second battery modules removably and respectively disposed in the second loading boxes. Each of the second loading boxes is permitted to be removably coupled to each other and between corresponding two of the first loading boxes to cooperatively define a loading surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
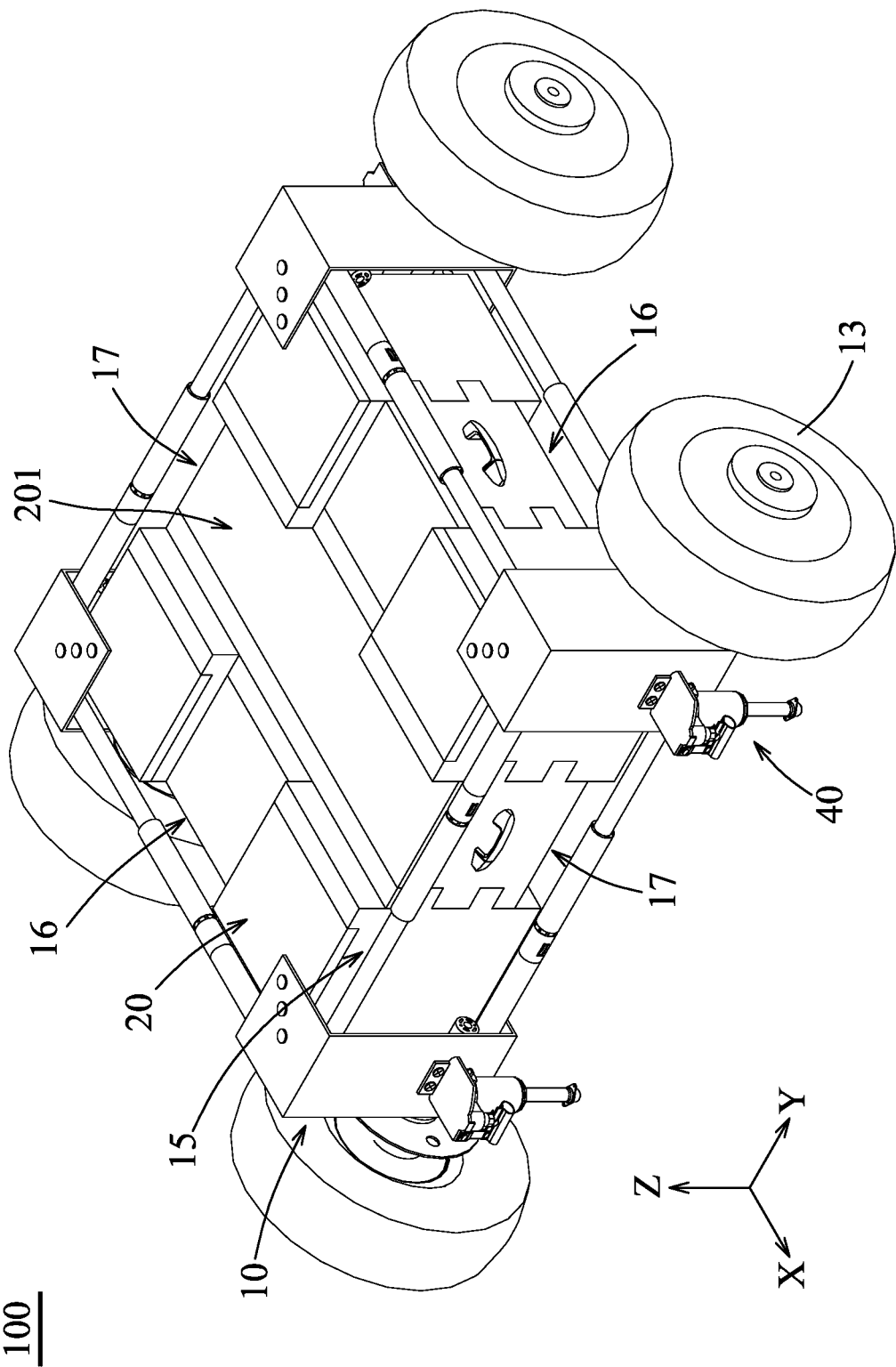
FIG. 1 is a perspective view of a first embodiment of a vehicle chassis according to the disclosure, illustrating a vehicle frame in a first expanded state and a first loading assembly in a separated state.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a vehicle chassis 100 is adapted for use with an electric vehicle. The electric vehicle can be a battery electric vehicle (BEV), a hybrid electric vehicle (HEV) or a plug-in hybrid electric vehicle (PHEV). The electric vehicle 100 is permitted to travel in a front-rear direction (X). The vehicle chassis 100 includes a vehicle frame 10, a loading device 20, and a lifting device 40.

Figure 2:
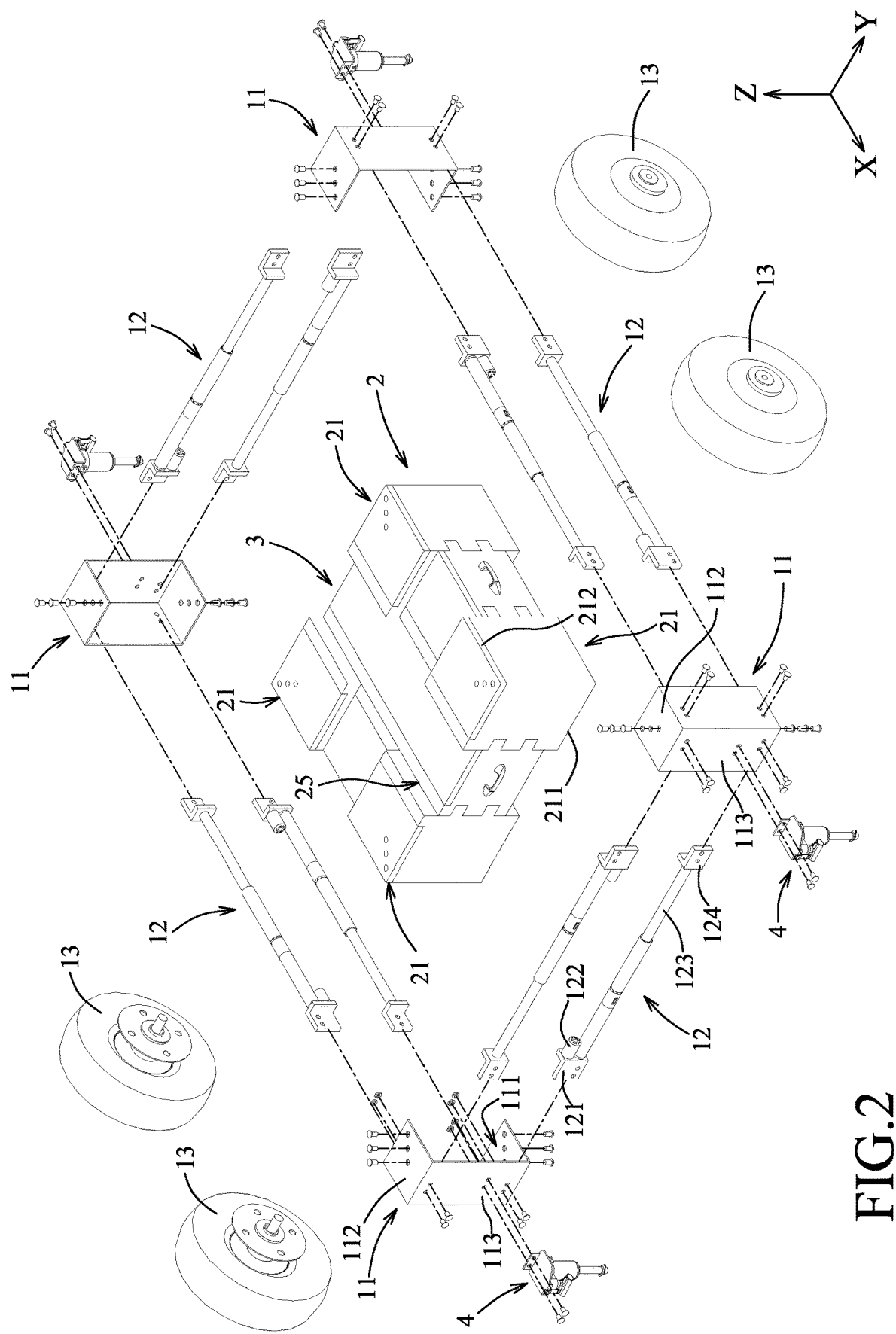
FIG. 2 is a partly exploded perspective view of the first embodiment, illustrating interconnecting relationship among the vehicle frame, a loading device and a lifting device.

Referring to FIGS. 1 and 2, the vehicle frame 10 is substantially rectangular and includes four casing members 11 respectively disposed at four corners of the vehicle frame 10, four pairs of telescopic rods 12, and four wheels 13. Each of the casing members 11 is made of a metallic material and has a top plate 111, a bottom plate 112 that is below and that is spaced apart from the top plate 111, and two vertical plates 113 that interconnect the top and bottom plates 111, 112. The vertical plates 113 are connected to each other to become a reclined L-shaped structure and respectively interconnect corresponding two of outer peripheral sides of the top plate 111 to corresponding two of outer peripheral sides of the bottom plate 112. For example, for the left-front one of the casing members 11, front-and-rear facing one of the vertical plates 113 thereof interconnects the front peripheral sides of the top and bottom plates 111, 112, and the lateral-facing one of the vertical plates 113 interconnects the left peripheral sides of the top and bottom plates 111, 112. Each of the wheels 13 is rotatably connected to the lateral-facing vertical plate 113 of a respective one of the casing members 11 via fasteners such as bolts and nuts, and is permitted to be in contact with ground 5. Each of the wheels 13 may have a built-in steering mechanism.

Each of the telescopic rods 12 has two opposite ends that are respectively and fixedly connected to corresponding two of the casing members 11, such that the casing members 11 and the telescopic rods 12 cooperatively define a substantially rectangular inner space 15 thereamong. Specifically, two pairs of the telescopic rods 12 are spaced apart from each other in the front-rear direction (X), extend in a lateral direction (Y) perpendicular to the front-rear direction (X) and respectively define two end openings 17 that are respectively at front and rear sides of the vehicle frame 10 and that are spaced apart in the front-rear direction (X), and the remaining two of the telescopic rods 12 are spaced apart from each other in the lateral direction (Y), extend in the front-rear direction (X), and respectively define two lateral openings 16 that are respectively at two opposite lateral sides of the vehicle frame 10 and that are spaced apart in the lateral direction (Y). In this embodiment, each of the telescopic rods 12 is an electric cylinder, and has a cylinder body 121, a motor 122, a rod body 123 that is permitted to telescopically extend through the cylinder body 121, a connecting plate 124 that is mounted to an end of the rod body 123 distal to the cylinder body 121, and a transmission member (not shown) that is mounted in the cylinder body 121 and that interconnects the motor 122 to the rod body 123. The cylinder body 121 and the connecting plate 124 of each of the telescopic rods 12 are respectively and fixedly connected to the vertical plates 113 of the corresponding two of the casing members 11 via fasteners such as bolts and nuts (as shown in FIG. 2). By utilizing the motor 122 of each of the telescopic rods 12 to drive the rod body 123 thereof, the vehicle frame 10 is operable to switch between a first expanded state (see FIG. 1) and a collapsed state (see FIG. 13) by telescopically extending in both the front-rear direction (X) and the lateral direction (Y).

Figure 3:
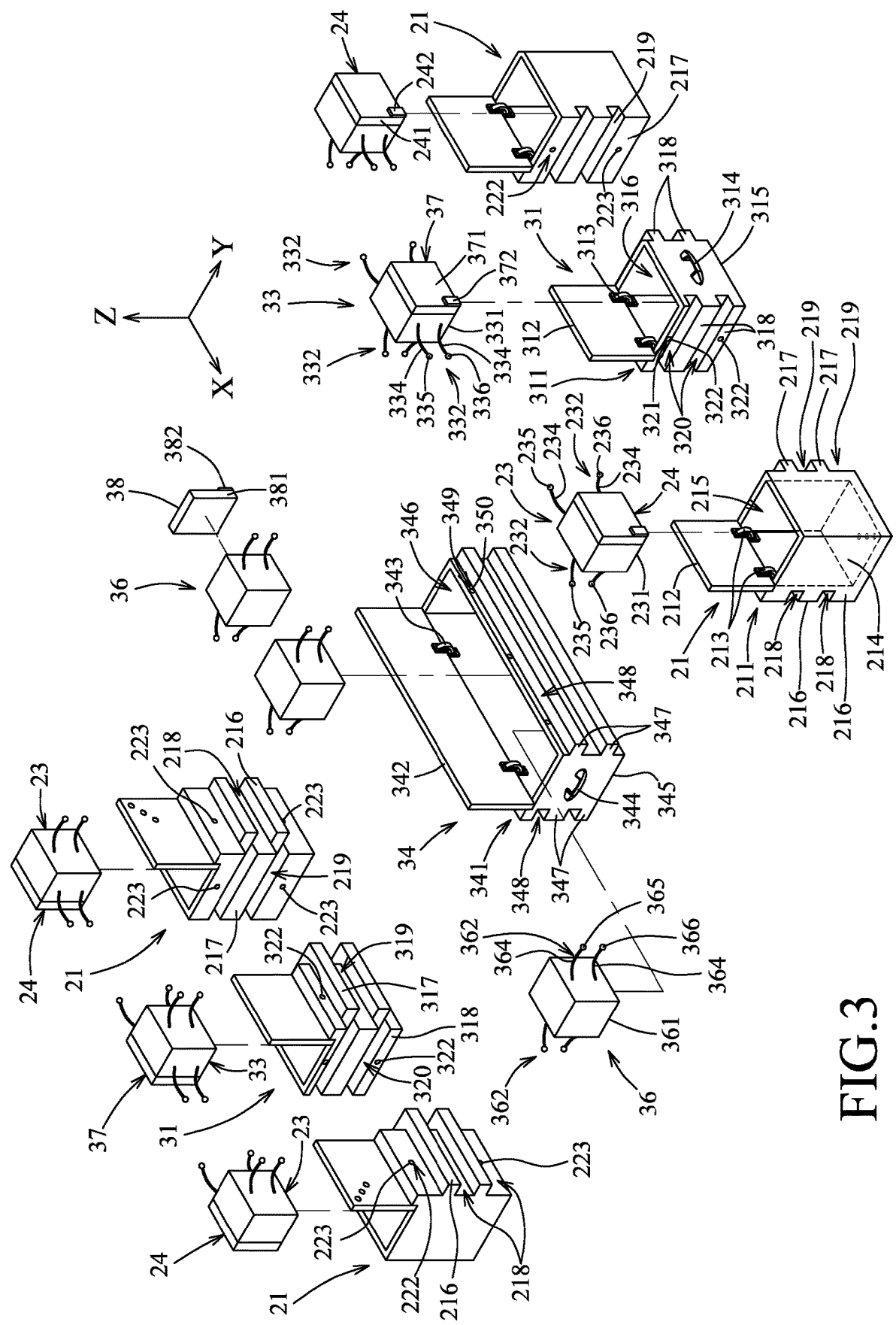
FIG. 3 is an exploded perspective view of the loading device of the first embodiment.
Figure 4:
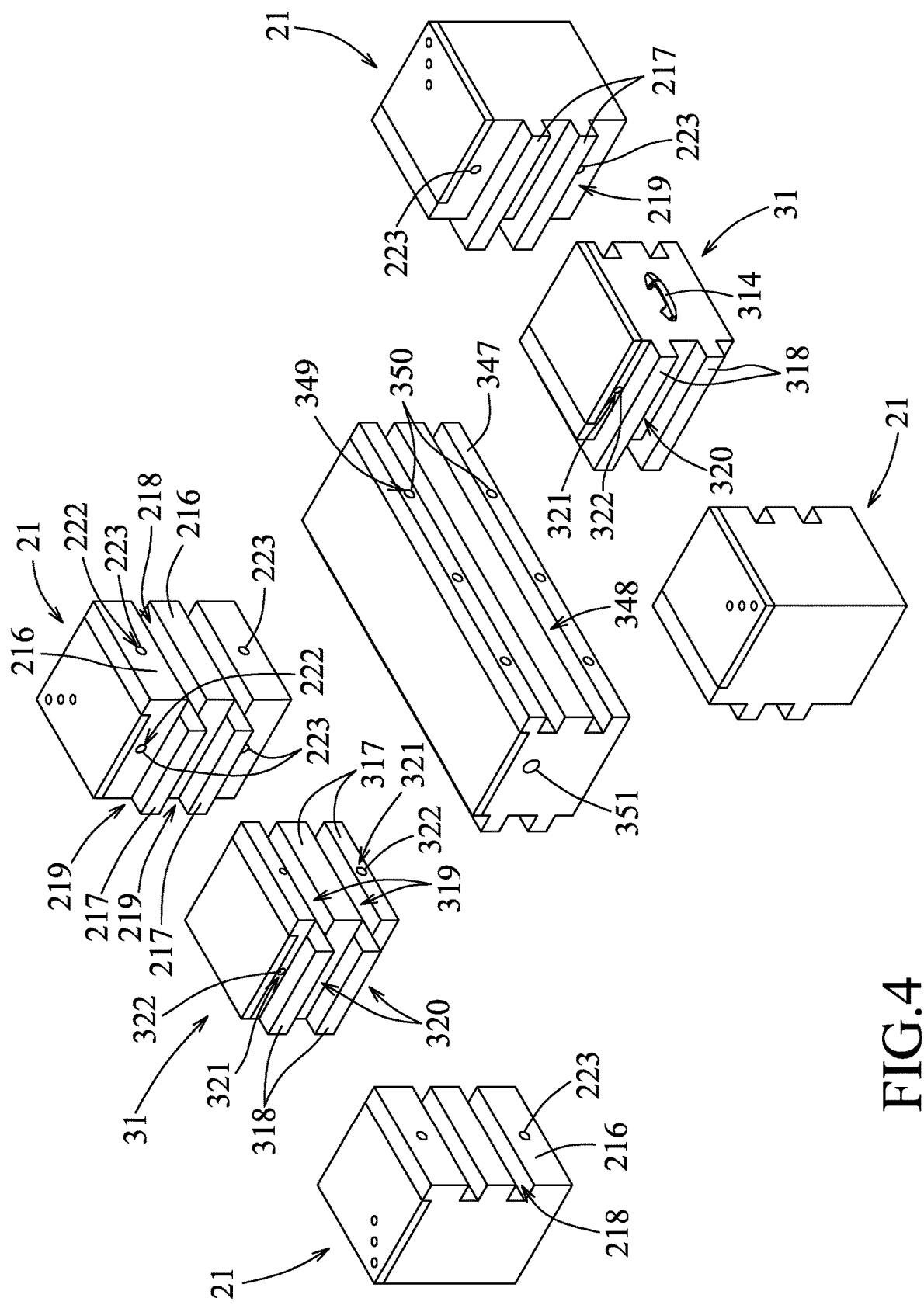
FIG. 4 is another exploded perspective view of the loading device of the first embodiment.

Referring to FIGS. 2 to 4, the loading device 20 is mounted to the inner space 15 (as shown in FIG. 1) and includes a first loading assembly 2 that is removably connected to the vehicle frame 10, and a second loading assembly 3 that is removably coupled to the first loading assembly 2.

The first loading assembly 2 includes four first loading boxes 21 respectively and removably connected to the casing members 11 of the vehicle frame 10, four first battery modules 23 respectively and removably disposed in the first loading boxes 21, and four first control modules 24 respectively assembled in the first loading boxes 21. In the embodiment, each of the first loading boxes 21 has a box body 211, a cover body 212, and a plurality of hinges 213. The box body 211 includes a substantially cubic box portion 214 that defines a storage space 215 therein for storing one of the first battery modules 23, and that has an open top end. The hinges 213 pivotally interconnect the box portion 214 and the cover body 212 so that the cover body 212 is permitted to enclose the storage space 215 by pivotally covering the top end of the box portion 214.

Each of the first loading boxes 21 includes a plurality of first guiding tongues 216 protruding from one of lateral sides thereof proximate to center of the vehicle chassis 100 and extending in the front-rear direction (X), and a plurality of second guiding tongues 217 protruding from one of front and rear sides thereof proximate to the center of the vehicle chassis 100 and extending in the lateral direction (Y). The first guiding tongues 216 are spaced apart from each other in an up-down direction (Z) perpendicular to both the front-rear direction (X) and the lateral direction (Y) to define a plurality of first guiding grooves 218, and the second guiding tongues 217 are spaced apart from each other in the up-down direction (Z) to define a plurality of second guiding grooves 219. Each of the first guiding tongues 216 is permitted to be slidably connected to a corresponding one of the first guiding grooves 218, and each of the second guiding tongues 217 is permitted to be slidably connected to a corresponding one of the second guiding grooves 219, such that each of the first loading boxes 21 is permitted to be removably coupled to adjacent ones of the first loading boxes 21.

In the embodiment, of the four first loading boxes 21, each of leftmost two includes three of the first guiding tongues 216 and two of the first guiding grooves 218, each of rightmost two includes two of the first guiding tongues 216 and three of the first guiding grooves 218, each of frontmost two includes two of the second guiding tongues 217 and three of the second guiding grooves 219, and each of rearmost two includes three of the second guiding tongues 217 and two of the second guiding grooves 219. The first loading boxes 21 are disposed between the top and bottom plates 111, 112 of the respective ones of the casing members 11, and are removably connected thereto via fasteners such as screws.

Figure 14:
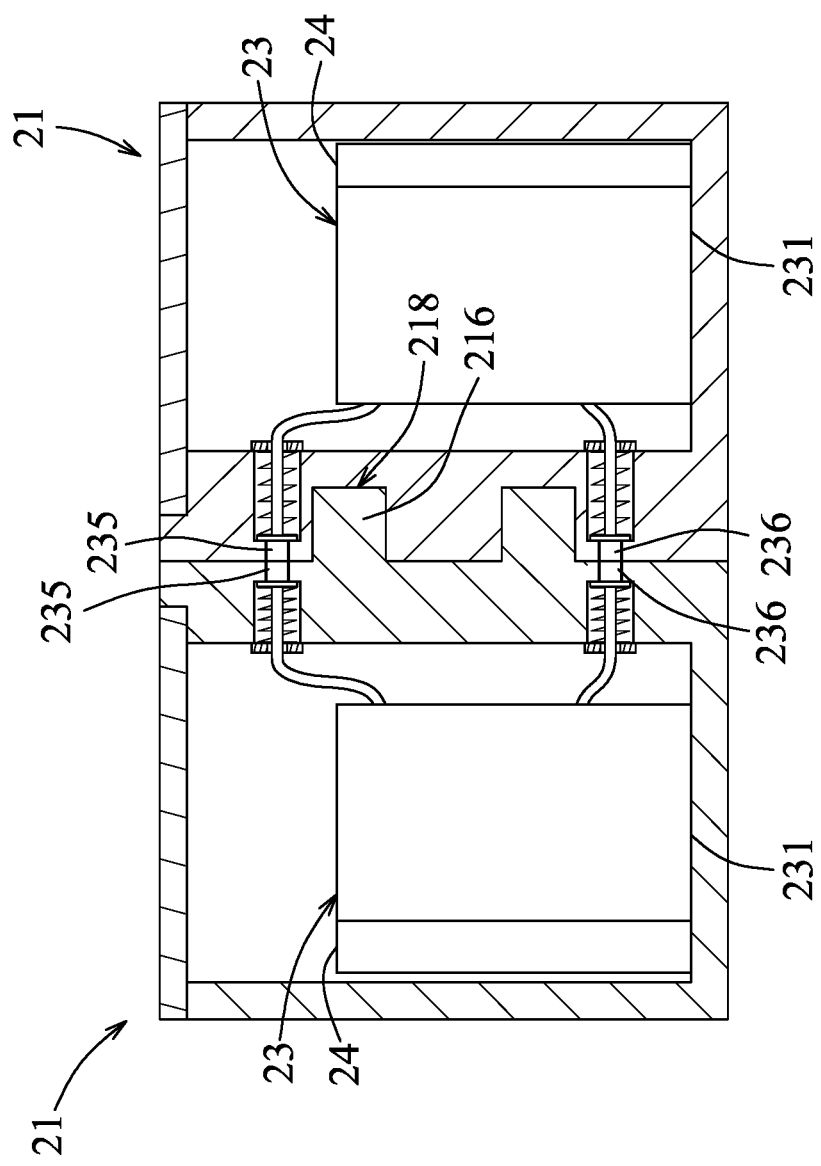
FIG. 14 is a is a schematic sectional view of the loading device of the first embodiment, illustrating the coupling relationship between two first loading boxes.

The first loading boxes 21 of the first loading assembly 2 are operable to be driven by the casing members 11 of the vehicle frame 10 to switch between a separated state (see FIG. 1) and an assembled state (see FIG. 14). When the vehicle frame 10 is in the first expanded state, the first loading assembly 2 is in the separated state, and the first loading boxes 21 are spaced apart from each other to define a mounting space 25 thereamong is that registered to the lateral and end openings 16, 17 for the second loading assembly 3 to be mounted thereto and to be coupled to the first loading assembly 2. When the vehicle frame 10 is in the collapsed state, the second loading assembly 3 is separated from the first loading assembly 2, and the first loading assembly 2 is in the assembled state, in which the first loading boxes 21 are coupled to each other.

The box body 211 of each of the first loading boxes 21 includes two first through hole units 222 that are spatially communicated with the storage space 215. For each of the first loading boxes 21, one of the first through hole units 222 is disposed on the side of the box body 211 having the first guiding tongues and grooves 216, 218, and the other one of the first through hole units 222 is disposed on the side of the box body 211 having the second guiding tongues and grooves 217, 219. Each of the first through hole units 222 has two first through holes 223 that are spaced apart in the up-down direction (Z). In the embodiment, the first through holes 223 of each of the first through hole units 222 are respectively disposed proximate to top and bottom ends of the box body 221, and the first through hole units 222 of each of the first loading boxes 21 are respectively registered with the first through hole units 222 of the adjacent ones of the first loading boxes 21. Each of the first through holes 223 has an enlarged end section 225 that is spatially communicated to the storage space 215, a shrunk end section 226 that is spatially communicated to an external environment, a shoulder section 227 that interconnects the enlarged end section 225 and the shrunk end section 226.

Each of the first battery modules 23 includes a first battery 231 and two first electrode units 232 that respectively extend through the first through hole units 222. The first battery 231 is mounted in the storage space 215 of the box body 211 of a respective one of the first loading boxes 21. Each of the first electrode units 232 has two first wires 234 connected to the first battery 231, a positive electrode 235 connected to an end of one of the first wires 234, and a negative electrode 236 connected to an end of the other one of the first wires 234. The positive and negative electrodes 235, 236 are made of metallic materials that are both magnetic and conductive. Each of the first wires 234 of the first electrode units 232 extends through a respective one of the first through holes 223 of the first through hole units 222, such that the positive electrode 235 extends into a top one of the first through holes 223, and the negative electrode 236 extends into a bottom one of the first through holes 223. For each of the first through holes 223, after one of the positive and negative electrodes 235, 236 extends thereinto, a resilient member 228 and an abutment member 229 are assembled thereto to ensure that the one of the positive and negative electrodes 235, 236 is positioned in the shrunk end section 226 thereof to remain exposed to the external environment. Specifically, the abutment member 229 is fixedly mounted to an end of the enlarged end section 225 distal to the shrunk end section 226, and the resilient member 228 is disposed in the enlarged end section 225 and has one end resiliently abutting against the abutment member 229, and the other end abutting against the one of the positive and negative electrodes 235, 236 to push the one of the positive and negative electrodes 235, 236 against the shoulder section 227. When the vehicle frame 10 is in the collapsed state and the first loading assembly 2 is in the assembled state, the first battery modules 23 are electrically connected to each other in parallel. Specifically, the two positive electrodes 235 of each of the first battery modules 23 are respectively and electrically connected to the positive electrodes 235 of two adjacent ones of the first battery modules 23, and the two negative electrodes 236 of each of the first battery modules 23 are respectively and electrically connected to the negative electrodes 236 of two adjacent ones of the first battery modules 23. The magnetic feature of the positive and negative electrodes 235, 236 ensures stable electric connection between corresponding two of the positive electrodes 235 and between corresponding two of the negative electrodes 236.

For each of the first loading boxes 21, the first control module 24 is mounted in the storage space 215, and includes a first circuit board 241 electrically connected to the first battery 231 and a first wireless chip 242 mounted to the first circuit board 241. The first wireless chip 242 may conduct wireless communication via means such as wifi, bluetooth, or NFC. The first control module 24 is permitted to be signally connected to a communication device (not shown) such as a smartphone, a tablet, or a user interface in the electric vehicle via the first wireless chip 242 for a user to monitor stored electricity in the first battery 231.

The second loading assembly 3 includes two second loading boxes 31, two second battery modules 33 respectively and removably disposed in the second loading boxes 31, a third loading box 34, three third battery modules 36 removably disposed in the third loading box 34, two second control modules 37 respectively assembled in the second loading boxes 31, and a third control module 38 assembled in the third loading box 34. In the embodiment, each of the second loading boxes 31 has a box body 311, a cover body 312, a plurality of hinges 313, and a first handle 314. The box body 311 includes a substantially cubic box portion 315 that defines a storage space 316 therein for storing one of the second battery modules 33, and that has an open top end. The hinges 313 pivotally interconnect the box portion 315 and the cover body 312 so that the cover body 312 is permitted to enclose the storage space 316 by pivotally covering the top end of the box portion 315.

Each of the second loading boxes 31 includes a plurality of third guiding tongues 317 protruding from one of lateral sides thereof proximate to center of the vehicle chassis 100 and extending in the front-rear direction (X), and a plurality of fourth guiding tongues 318 protruding from front and rear sides thereof and extending in the lateral direction (Y). The third guiding tongues 317 are spaced apart in the up-down direction (Z) to define a plurality of third guiding grooves 319, and the fourth guiding tongues 318 at each side of the second loading box 31 are spaced apart in the up-down direction (Z) to define a plurality of fourth guiding grooves 320. Each of the fourth guiding tongues 318 is permitted to be slidably connected to a corresponding one of the second guiding grooves 219, and each of the second guiding tongues 217 is permitted to be slidably connected to a corresponding one of the fourth guiding grooves 320, such that each of the second loading boxes 31 is permitted to be removably coupled between corresponding two of the first loading boxes 21.

For each of the second loading boxes 31, the first handle 314 is mounted to a lateral outer side of the box portion 315. The user may easily pull each of the second loading boxes 31, via the first handle 314 thereof, to slide in the lateral direction (Y) and to be respectively uncoupled from the corresponding two of the first loading boxes 21 through a respective one of the lateral openings 16, or vice-versa.

In the embodiment, for each of the second loading boxes 31, the front side thereof includes three of the fourth guiding tongues 318 and two of the fourth guiding grooves 320, and the rear side thereof includes two of the fourth guiding tongues 318 and three of the fourth guiding grooves 320. However, the left one of the second loading boxes 31 includes three of the third guiding tongues 317 and two of the third guiding grooves 319, and the right one of the second loading boxes 31 includes two of the third guiding tongues 317 and three of the third guiding grooves 319.

The box body 311 of each of the second loading boxes 31 includes three second through hole units 321 that are respectively disposed on front, rear, center-facing lateral sides thereof and that are spatially communicated with the storage space 316. Each of the second through hole units 321 has two second through holes 322 that are spaced apart in the up-down direction (Z). In the embodiment, the second through holes 322 of each of the second through hole units 321 are respectively disposed proximate to top and bottom ends of the box body 311, and the second through hole units 321 disposed on the front and rear sides of each of the second loading boxes 31 are respectively registered with the first through hole units 222 of the adjacent ones of the first loading boxes 21. Each of the second through holes 322 has an enlarged end section 324 that is spatially communicated to the storage space 316, a shrunk end section 325 that is spatially communicated to an external environment, a shoulder section 326 that interconnects the enlarged end section 324 and the shrunk end section 325.

Figure 5:
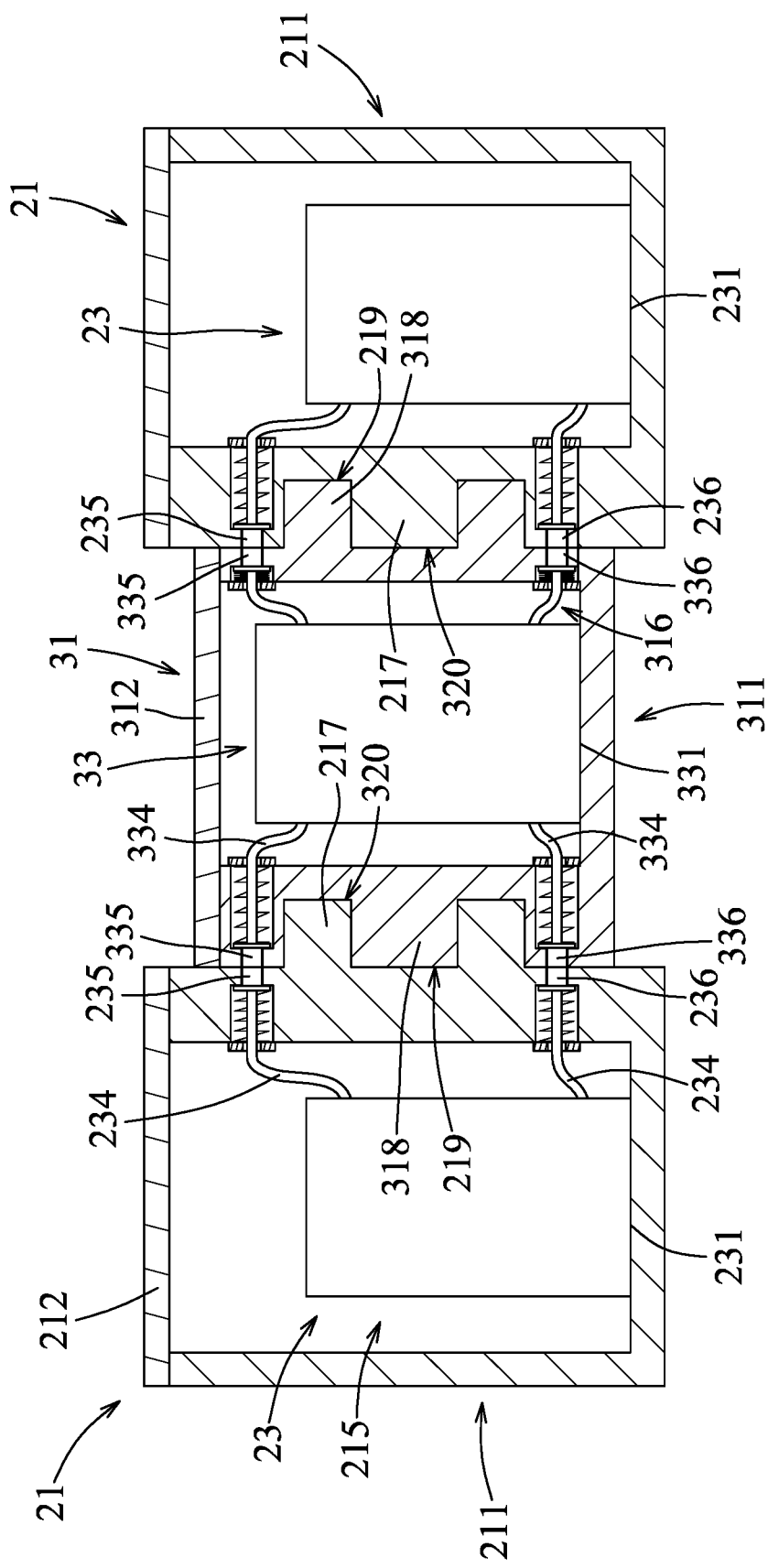
FIG. 5 is a schematic sectional view of the loading device of the first embodiment, illustrating the coupling relationship of one of second loading boxes thereof with corresponding two of first loading boxes thereof.
Figure 6:
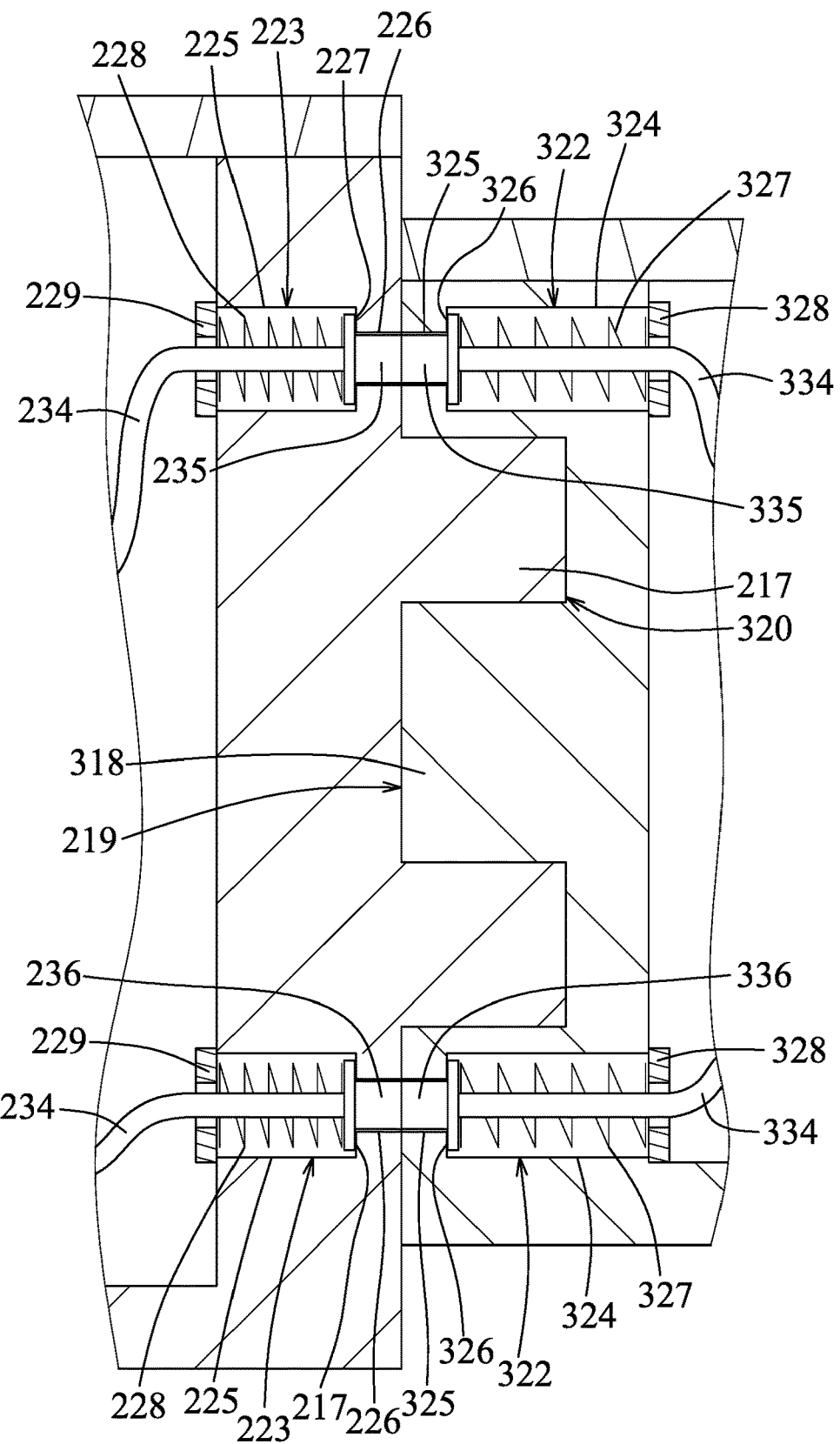
FIG. 6 is a fragmentary enlarged view of FIG. 5.

Referring back to FIGS. 3, 5 and 6, the second battery module 33 is structurally similar to the first battery module 23. Each of the second battery modules 33 includes a second battery 331 and three second electrode units 332 that respectively extend through the second through hole units 321. The second battery 331 is mounted in the storage space 316 of the box body 311 of a respective one of the second loading boxes 31. Each of the second electrode units 332 has two second wires 334 connected to the second battery 331, a positive electrode 335 connected to an end of one of the second wires 334, and a negative electrode 336 connected to an end of the other one of the second wires 334. The positive and negative electrodes 335, 336 are made of metallic materials that are both magnetic and conductive. Each of the second wires 334 of the second electrode units 332 extends through a respective one of the second through holes 322 of the second through hole units 321, such that the positive electrode 335 extends into a top one of the second through holes 322, and the negative electrode 336 extends into a bottom one of the second through holes 322. For each of the second through holes 322, after one of the positive and negative electrodes 335, 336 extends thereinto, a resilient member 327 and an abutment member 328 are assembled thereto to ensure that the one of the positive and negative electrodes 335, 336 is positioned in the shrunk end section 325 thereof to remain exposed to the external environment. Specifically, the abutment member 328 is fixedly mounted to an end of the enlarged end section 324 distal to the shrunk end section 325, and the resilient member 327 is disposed in the enlarged end section 324 and has one end resiliently abutting against the abutment member 328, and the other end abutting against the one of the positive and negative electrodes 335, 336 to push the one of the positive and negative electrodes 335, 336 against the shoulder section 326. When the vehicle frame 10 is in the first expanded state and when each of the second loading boxes 31 is coupled to the corresponding two of the first loading boxes 21, two of the second electrode units 332 of each of the second battery modules 33 are respectively and electrically connected to one of the first electrode units 232 of corresponding two of the first battery module 23. Specifically, the positive electrode 335 of each of the second electrode units 332 is electrically connected to the positive electrode 235 of the corresponding one of the first electrode units 232, and the negative electrode 336 of each of the second electrode units 332 is electrically connected to the negative electrode 236 of the corresponding one of the first electrode units 232. The magnetic feature of the positive and negative electrodes 335, 336 ensures stable electric connection between corresponding two of the positive electrodes 235, 335 and between corresponding two of the negative electrodes 236, 236.

For each of the second loading boxes 31, the second control module 37 is mounted in the storage space 316 and includes a second circuit board 371 electrically connected to the second battery 331 and a second wireless chip 372 mounted to the second circuit board 371. The second wireless chip 372 may conduct wireless communication via means such as wifi, bluetooth, or NFC. The second control module 37 is permitted to be signally connected to the communication device via the second wireless chip 372 for the user to monitor stored electricity in the second battery 331.

Figure 7:
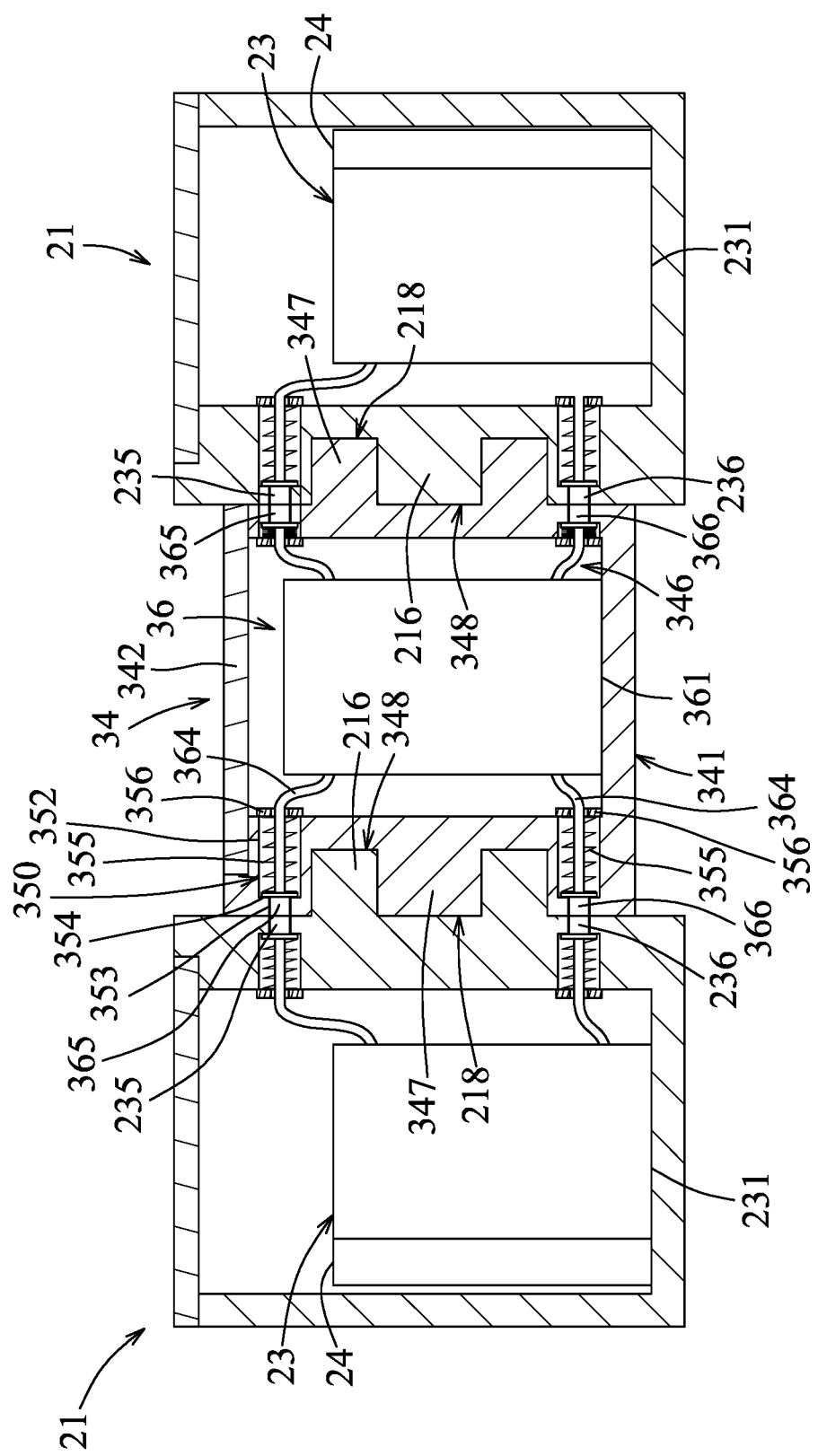
FIG. 7 is a schematic sectional view of the loading device of the first embodiment, illustrating the coupling relationship of a third loading box thereof with two of the first loading boxes.

Referring to FIGS. 3, 4 and 7, in the embodiment, the third loading box 34 has a box body 341, a cover body 342, a plurality of hinges 343, and a second handle 344. The box body 341 includes a rectangular box portion 345 that extends in the front-rear direction (X), that defines a storage space 346 therein for storing the third battery modules 36, and that has an open top end. The hinges 343 pivotally interconnect the box portion 345 and the cover body 342 so that the cover body 342 is permitted to enclose the storage space 346 by pivotally covering the top end of the box portion 345.

The third loading box 34 includes a plurality of fifth guiding tongues 347 extending in the front-rear direction (X) and protruding from lateral sides thereof. The fifth guiding tongues 347 at each side of the third loading box 34 are spaced apart in the up-down direction (Z) to define a plurality of fifth guiding grooves 348. Each of the fifth guiding tongues 347 is permitted to be slidably connected to corresponding ones of the first and third guiding grooves 218, 319, and each of the first and third guiding tongues 216, 317 is permitted to be slidably connected to a corresponding one of the fifth guiding grooves 348, such that the third loading box 34 is permitted to be removably coupled among the first and second loading boxes 21,31.

The second handle 344 is mounted to a front side of the box portion 345. The user may easily pull the third box 34, via the second handle 344, to slide in the front-rear direction (X) and to be uncoupled from the first and second loading boxes 21, 31 through one of the end openings 17 (as seen in FIG. 1), or vice-versa.

In the embodiment, the left side of the third loading box 34 includes two of the fifth guiding tongues 347 and three of the fifth guiding grooves 348, and the right side thereof includes three of the fifth guiding tongues 347 and two of the fifth guiding grooves 348.

The box body 341 of the third loading box 34 includes six third through hole units 349 that are spatially communicated with the storage space 346. Each of the third through hole units 349 has two third through holes 350 that are spaced apart in the up-down direction (Z). Three of the third through hole units 349 are disposed on the left side of the box body 341, and the other three of the third through hole units 349 are disposed on the right side of the box body 341. In the embodiment, the third through holes 350 of each of the third through hole units 349 are respectively disposed proximate to top and bottom ends of the box body 341, four of the third through hole units 349 of the third loading box 34 are respectively registered with the first through hole units 222 at the center-facing lateral sides of the first loading boxes 21, and two of the third through hole units 349 of the third loading box 34 are respectively registered with the second through hole units 321 at the center-facing lateral sides of the second loading boxes 31. Each of the third through holes 350 has an enlarged end section 352 that is spatially communicated to the storage space 346, a shrunk end section 353 that is spatially communicated to an external environment, and a shoulder section 354 that interconnects the enlarged end section 352 and the shrunk end section 353.

Figure 8:
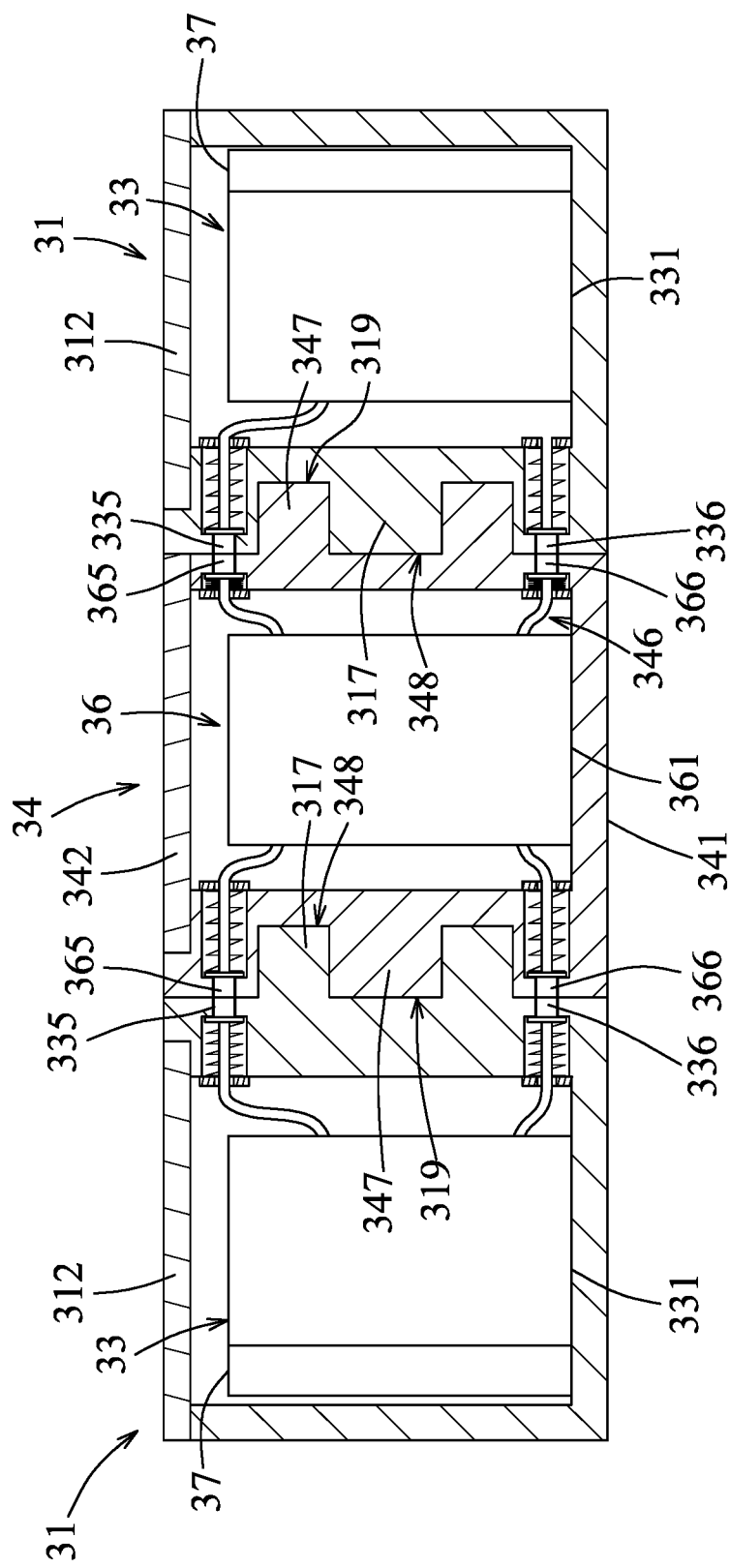
FIG. 8 is a schematic sectional view of the loading device of the first embodiment, illustrating the coupling relationship of the third loading box with the second loading boxes.

Referring to FIGS. 3, 7 and 8, the third battery module 36 is structurally similar to the first battery module 23. Each of the third battery modules 36 includes a third battery 361 and two third electrode units 362 that respectively extend through corresponding two of the third through hole units 349. The third battery 361 is mounted in the storage space 346 of the box body 341 of the third loading box 34. Each of the third electrode units 362 has two third wires 364 connected to the third battery 361, a positive electrode 365 connected to an end of one of the third wires 364, and a negative electrode 366 connected to an end of the other one of the third wires 364. The positive and negative electrodes 365, 366 are made of metallic materials that are both magnetic and conductive. Each of the third wires 364 of the third electrode units 362 extends through a respective one of the third through holes 350 of the third through hole units 349, such that the positive electrode 365 extends into a top one of the third through holes 350, and the negative electrode 366 extends into a bottom one of the third through holes 350. For each of the third through holes 350, after one of the positive and negative electrodes 365, 366 extends thereinto, a resilient member 355 and an abutment member 356 are assembled thereto to ensure that the one of the positive and negative electrodes 365, 366 is positioned in the shrunk end section 353 thereof to remain exposed to the external environment. Specifically, the abutment member 356 is fixedly mounted to an end of the enlarged end section 352 distal to the shrunk end section 353, and the resilient member 355 is disposed in the enlarged end section 352 and has one end resiliently abutting against the abutment member 356, and the other end abutting against the one of the positive and negative electrodes 365, 366 to push the one of the positive and negative electrodes 365, 366 against the shoulder section 354. When the vehicle frame 10 is in the first expanded state and when the third loading box 34 is coupled to the first and second loading boxes 21,31, the first, second and third battery modules 23, 33, 36 are electrically connected to each other in parallel, where each of the third electrode units 362 of one of the third battery modules 36 is electrically connected to one of the second electrode units 332 of a respective one of the second battery modules 33, and each of the third electrode units 362 of the remaining two of the third battery modules 36 is electrically connected to a corresponding one of the first electrode units 232, with the remaining two of the second electrode units 332 of each of the second battery modules 33 being respectively and electrically connected to the corresponding first electrode units 232. Specifically, for the third battery modules 23, the positive electrode 365 of each of the third electrode units 362 is electrically connected to the positive electrode 235, 335 of corresponding one of the first and second electrode units 232, 332, and the negative electrode 366 of each of the third electrode units 362 is electrically connected to the negative electrode 236, 336 of the corresponding one of the first and second electrode units 232, 332. The magnetic feature of the positive and negative electrodes 365, 366 ensures stable electric connection among the positive electrodes 235, 335, 365 and among the negative electrodes 236, 236, 366. Even when one of the battery modules has malfunctioned, the rest of the battery modules would remain functional to provide the electric vehicle electricity.

The third control module 38 is mounted in the storage space 346 and includes a third circuit board 381 electrically connected to the third battery 361 and a third wireless chip 382 mounted to the second circuit board 371. The second wireless chip 382 may conduct wireless communication via means such as wifi, bluetooth, or NFC. The third control module 38 is permitted to be signally connected to the communication device via the third wireless chip 382 for the user to monitor stored electricity in the third battery 361.

Figure 9:
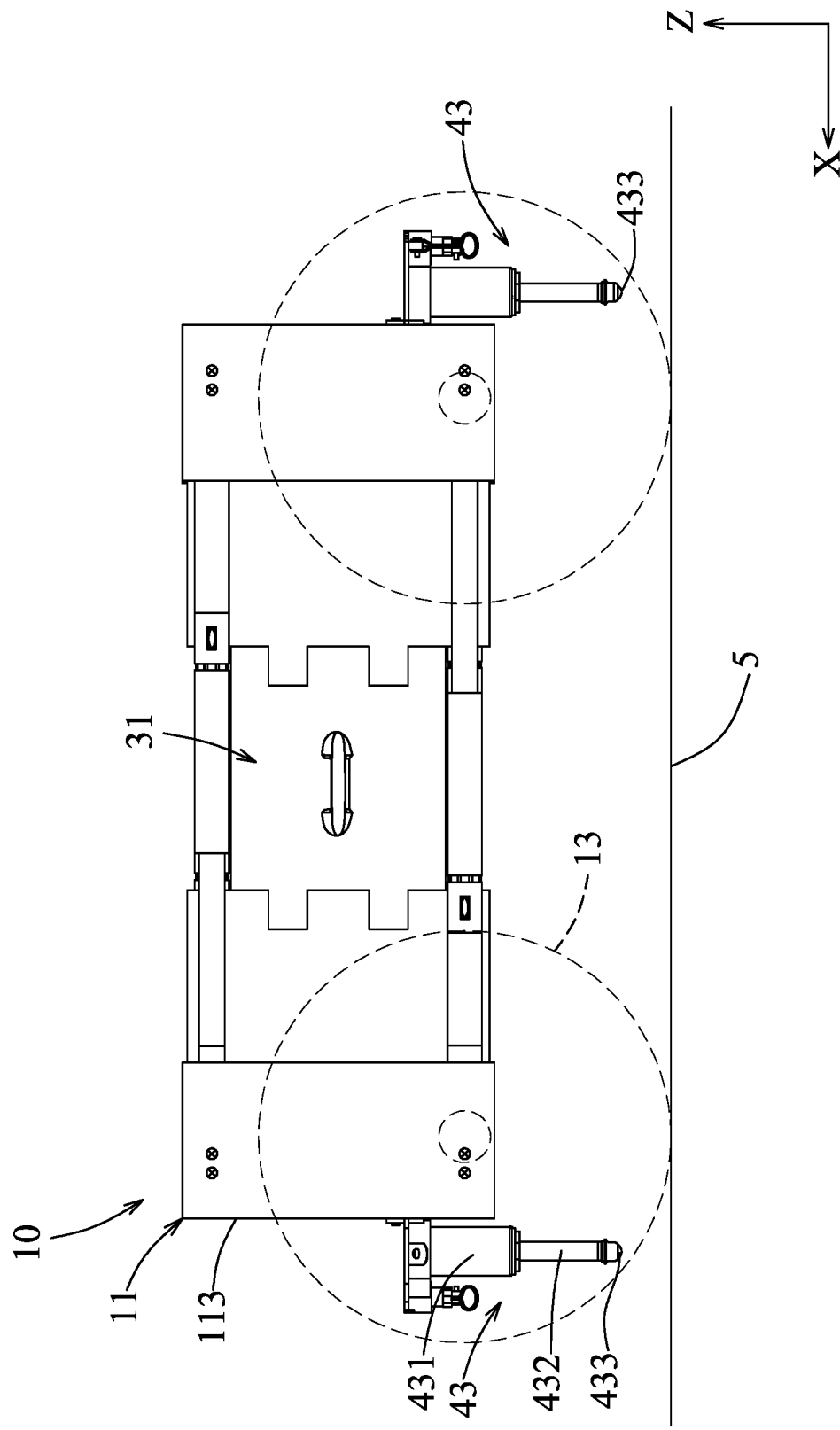
FIG. 9 is a side view of the first embodiment, illustrating top struts of jacks thereof in base position.

Referring to FIGS. 1 and 9, the lifting device 40 is for lifting the vehicle frame 10 such that the wheels 13 are not permitted to be in contact with the ground 5, so that the user may operate the vehicle frame 10 to switch between the first expanded state and the collapsed state. The lifting device 40 includes four electric jacks 43. Each of the jacks 43 has a jack main body 431 that is mounted to the respective one of the front-and-rear facing vertical plates 113 of the casing members 11 via bolts and nuts, and a top strut 432 that telescopically extends in the up-down direction (Z) from a bottom of the jack main body 431 and that has a contact member 433 disposed at a bottom thereof. For each of the jacks 43, the top strut 432 is operable to move between a base position (FIG. 9), where the contact member 433 is disposed higher than bottom of the wheels 13 such that the wheels 13 are in contact with the ground 5, and an extended position (FIG. 11), where the contact member 433 is disposed lower than the bottom of the wheels 13, such that the contact member 433 is to be in contact with the ground 5. In the embodiment, each of the contact members 433 is a freely-rotatable ball, which reduces frictional force between the contact member 433 and the ground 5 and facilitates the conversion of the vehicle frame 10 among various states.

Referring back to FIGS. 1 and 2, when the vehicle frame is in the first expanded state, the first, second and third loading boxes 21, 31, 34 cooperatively define a first loading surface 201.

Figure 10:
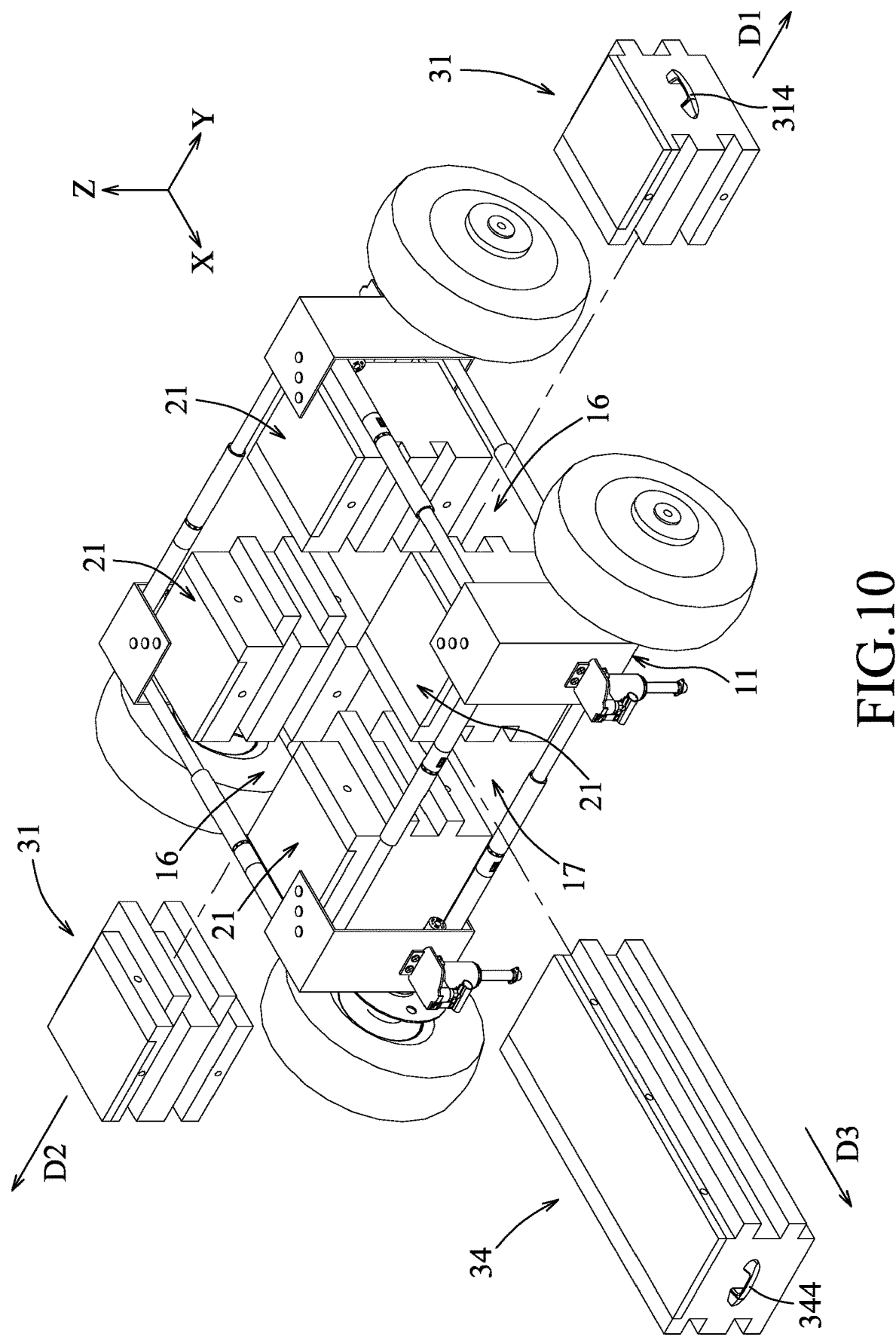
FIG. 10 is a partly exploded perspective view of the first embodiment, illustrating the second and third loading boxes being uncoupled from the first loading boxes.

Referring to FIGS. 3 and 10, to retrieve the second battery module 33 from the corresponding one of second loading boxes 31, the user would simply uncouple each of the second loading boxes 31 from the corresponding two of the first loading boxes 21 via pulling (D1, D2 as shown in FIG. 10) through the respective one of the lateral openings 16 in order to access the second battery module 33 therein. Likewise, to retrieve the third battery modules 36 from the third loading box 34, the user would simply uncouple the third loading box 34 from the first and second loading boxes 21, 31 via pulling (D3 as shown in FIG. 10) through the end opening 17 to access the third battery modules 36 therein. To recouple the second and third loading boxes 31, 34, the user simply push them back in the reverse direction. The coupling mechanism of the second and third loading boxes 31, 34 in the vehicle frame 10 allows the user to easily access the battery modules for repair, recharge and replacement. However, referring back to FIGS. 2 and 3, as the first loading boxes 21 are fixedly mounted to the casing members 11 via the likes of bolts and nuts, accessing the first battery modules 23 therefrom would still require additional tools, e.g., wrenches, to separate each of the first loading boxes 21 from the corresponding casing member 11.

Referring to FIGS. 5 to 8 and 10, to switch the vehicle frame 10 from the first expanded state to the collapsed state, the second and third loading boxes 31, 34 are to be uncoupled therefrom. It should be noted that when each of the first, second, and third loading boxes 21, 31, 34 are uncoupled from each other, the positive and negative electrodes 235, 335, 365, 236, 236, 366 would be pushed by corresponding ones of resilient members 228, 327, 355 to protrude slightly and outwardly from the box body.

Figure 11:
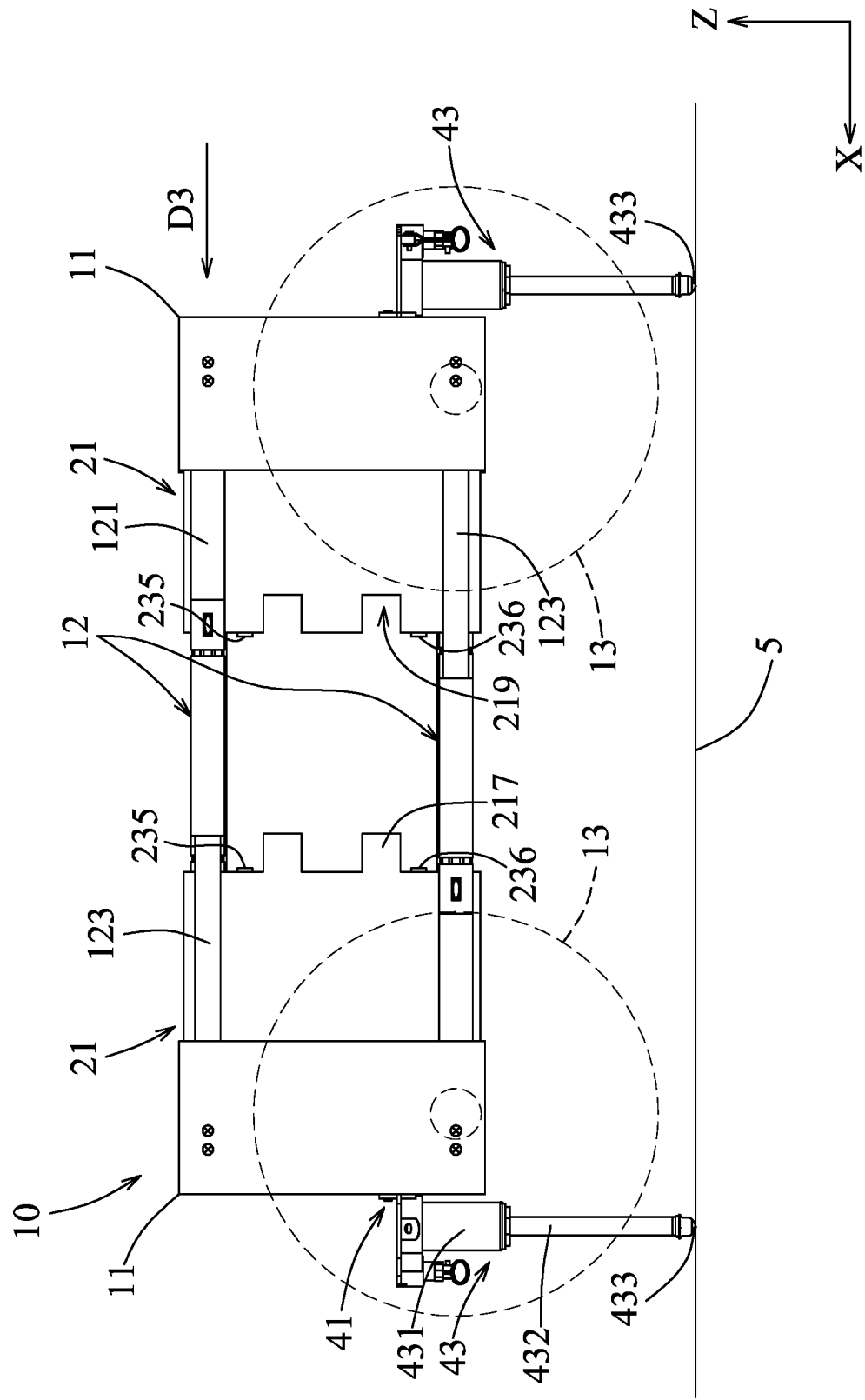
FIG. 11 is a side view of the first embodiment, illustrating the top struts of the jacks in extended position.

Referring to FIG. 11, afterward, the top strut 432 of each of the jack 43 extends downwardly in the up-down direction (Z) for the contact member 433 to be in contact with the ground 5, such that the vehicle frame 10 is lifted reciprocally and upwardly by the jack main body 431.

Figure 12:
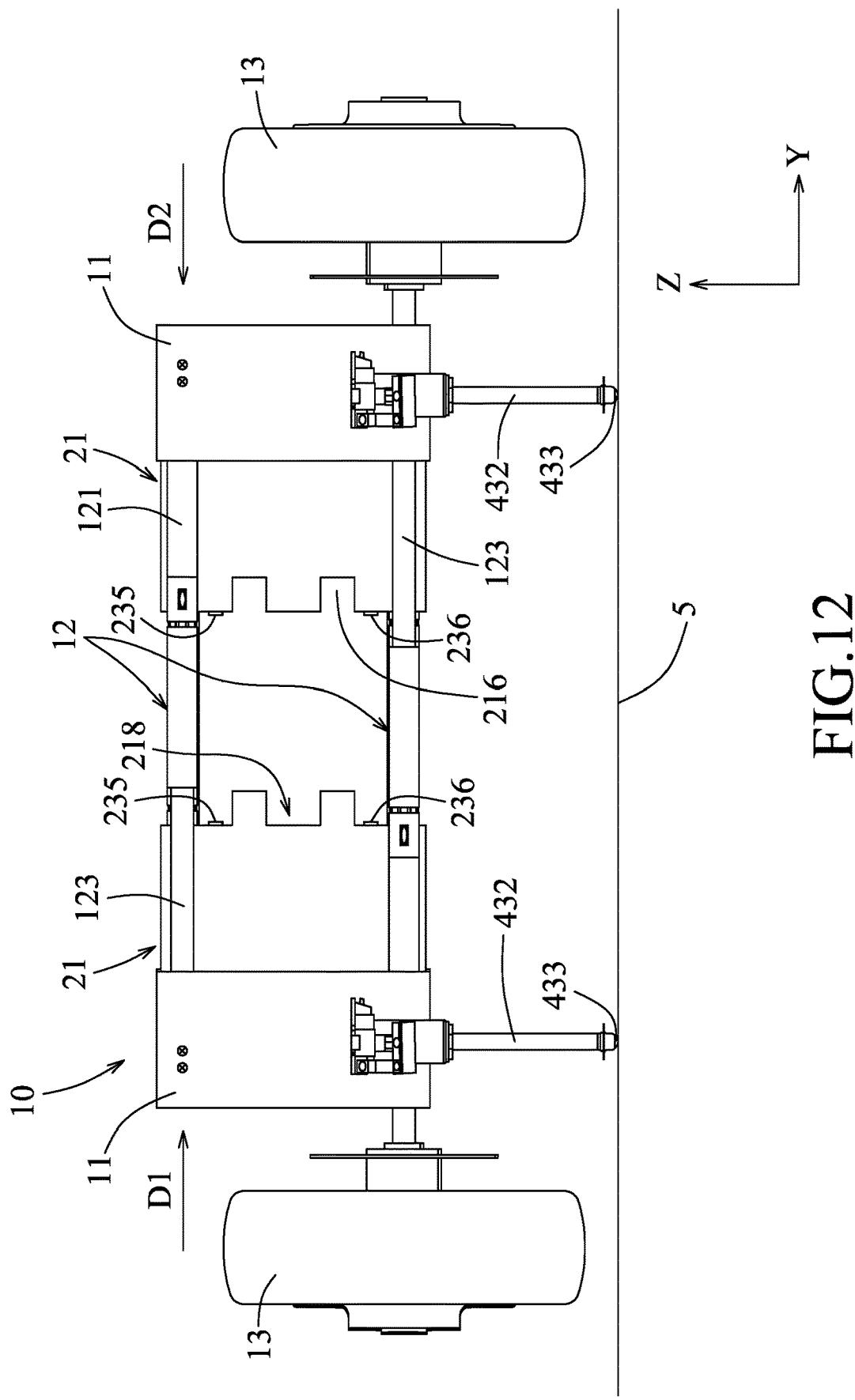
FIG. 12 is a front view of the first embodiment, illustrating the top struts of the jacks in the extended position.
Figure 13:
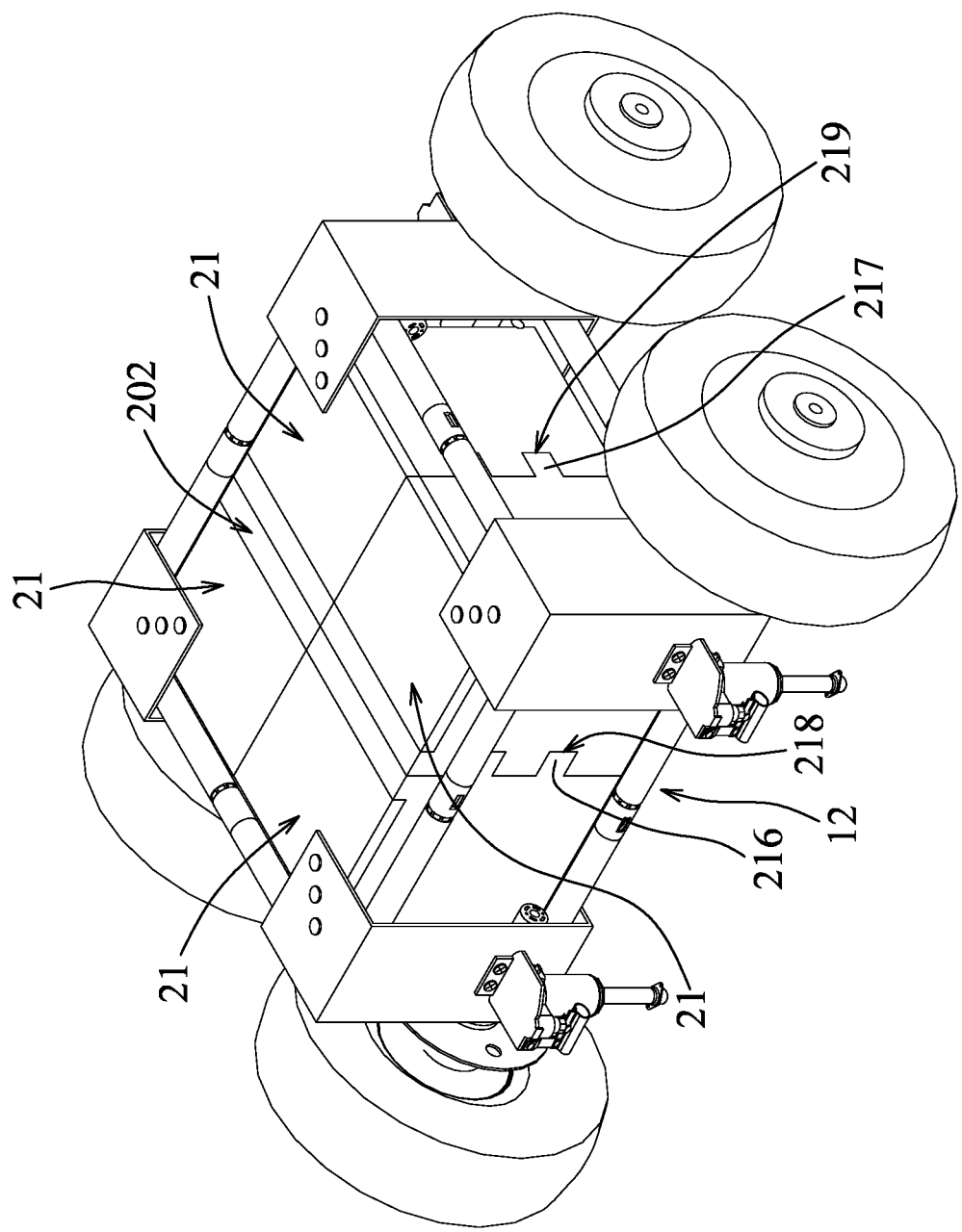
FIG. 13 is a perspective view of the first embodiment, illustrating the vehicle frame in a collapsed state and the first loading assembly in an assembled state.

Referring to FIGS. 11 to 13, by withdrawing the rod body 123 of each of the telescopic rods 12 back inside the cylinder body 121 via the motor 122 (shown in FIG. 2), the vehicle frame 10 is switched to the collapsed state (FIG. 13) where the casing members 11 move closer to center of the vehicle chassis 100 and the first loading assembly 2 is switched to the assembled state.

Once the vehicle frame 10 is in the collapsed state, the motor 122 stops. In the assembled state, each of the first guiding tongues 216 is slidably connected to the corresponding one of the first guiding grooves 218, and each of the second guiding tongues 217 is slidably connected to the corresponding one of the second guiding grooves 219, such that the first loading boxes 21 are coupled to each other to define a second loading surface 202 that is smaller than the first loading surface 201. In comparison to the first loading surface 201, the second loading surface 202 is more optimal for supporting a vehicle body of a smaller size, and satisfies demand of a single passenger when extra passenger space is not needed. After the vehicle frame 10 has been switched to the collapsed state, the top strut 432 of each of the jacks 43 move upwardly relative to the vehicle frame 10 so that the wheels 13 are back to be in contact with the ground 5 again (FIG. 9). Referring to FIG. 14, as mentioned before, when the vehicle frame is in the collapsed state, the positive electrodes 235 of any two of the first battery modules 23 are magnetically and electrically connected to each other, and the negative electrodes 236 of any two of the first battery modules 23 are magnetically and electrically connected to each other. As such, the first battery modules 23 are electrically connected to each other in parallel. Referring back to FIGS. 10 to 12, by reversing the order of the abovementioned operations, the vehicle frame 10 is reverted back to the first expanded state.

Figure 15:
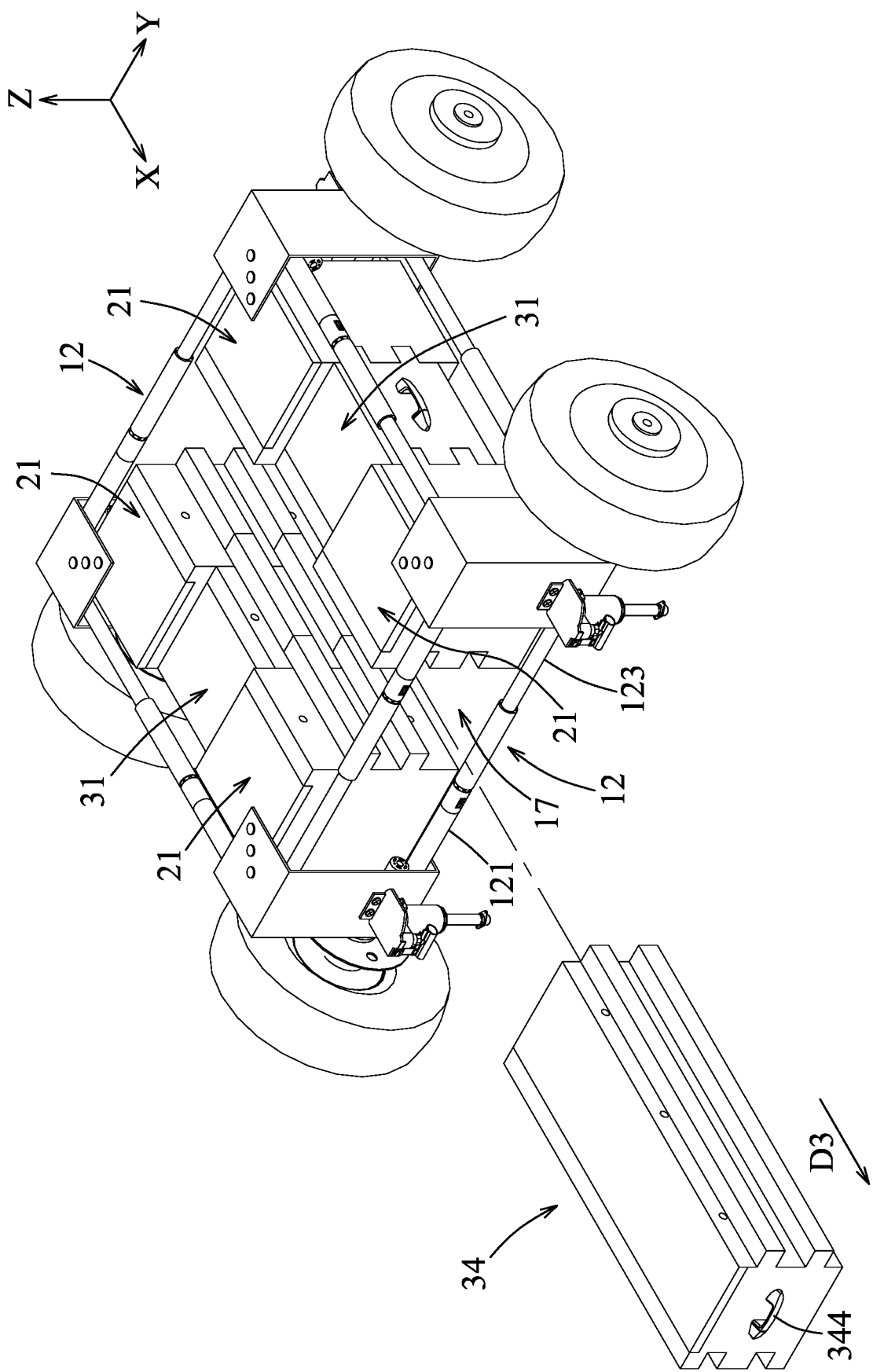
FIG. 15 is a partly exploded perspective view of the first embodiment, illustrating the third loading box being uncoupled from the first and second loading boxes.
Figure 16:
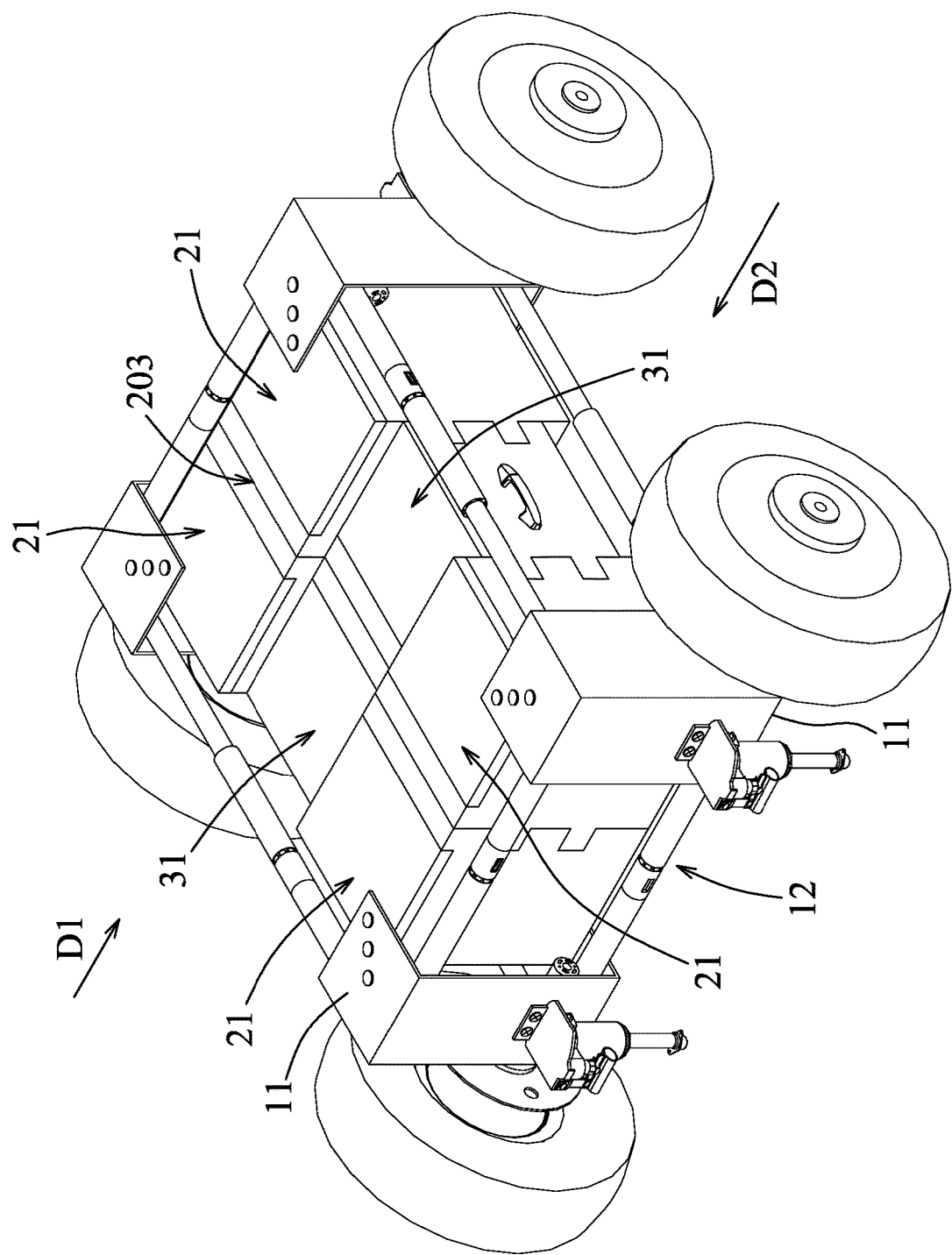
FIG. 16 is a perspective view of the first embodiment, illustrating the vehicle frame in a second expanded state.

Referring to FIGS. 12, 15 and 16, the vehicle frame 10 is operable to be further switched to a second expanded state. For example, to switch the vehicle frame 10 from the first expanded state to the second expanded state, the third loading box 31 is to be uncoupled therefrom through the end opening 17. Then, the top strut 432 of each of the jack 43 are to be driven to extend downwardly to lift the vehicle frame 10 upwardly. Afterward, by withdrawing the rod body 123 of each of the telescopic rods 12 that extend in the lateral direction (Y) back inside the cylinder body 121 via the motor 122 (shown in FIG. 2), the vehicle frame 10 is switched to the second expanded state (FIG. 16) where the casing members 11 move laterally toward the center of the vehicle chassis 100. Once the vehicle frame 10 is in the second expanded state, the motor 122 stops. When the vehicle frame 10 is in the second expanded state, each of the second loading boxes 31 is removably coupled to each other and between the corresponding two of the first loading boxes 21 to cooperatively define a third loading surface 203 that is smaller than the first loading surface 201 and that is larger than the second loading surface 202. The third loading surface 203 is more optimal for supporting a long and narrow vehicle body.

Figure 17:
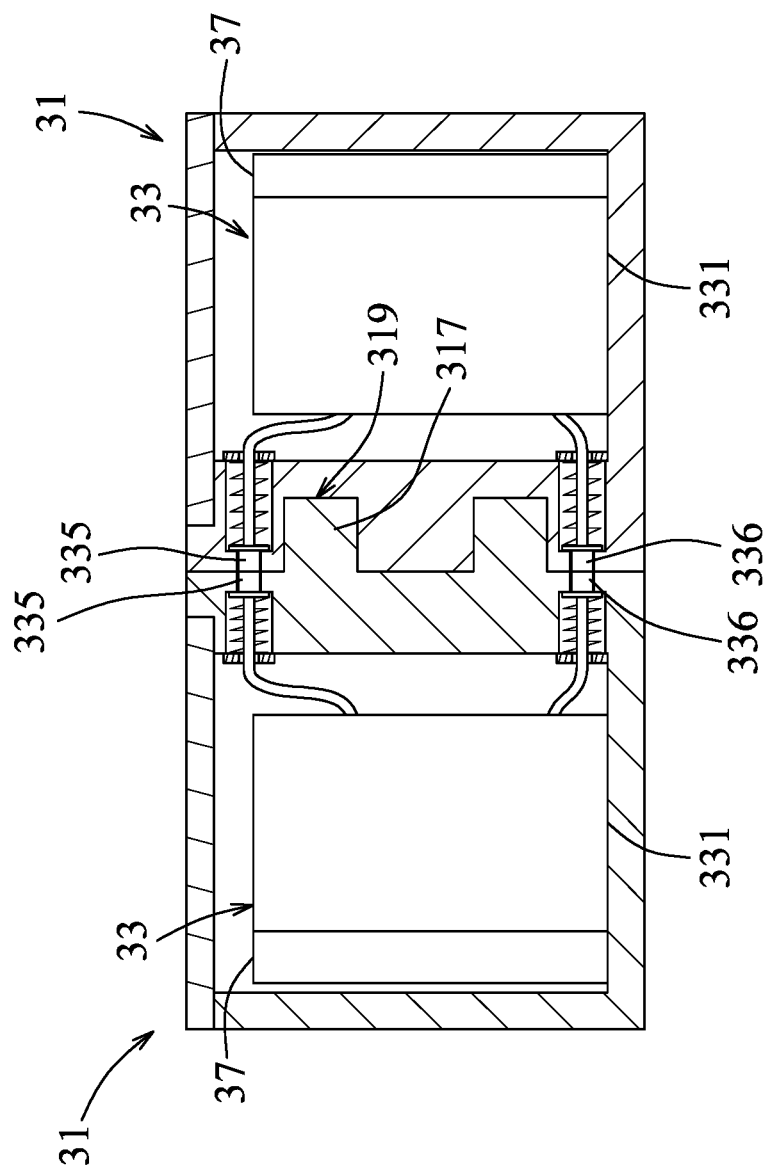
FIG. 17 is a schematic sectional view of the loading device of the first embodiment, illustrating the coupling relationship between two second loading boxes.

Referring to FIG. 17, when the vehicle frame 10 is in the second expanded state, the positive electrodes 335 of the second battery modules 33 are magnetically and electrically connected to each other, and the negative electrodes 336 thereof are magnetically and electrically connected to each other as well. As such, the first and second battery modules 23, 33 are electrically connected to each other in parallel. Referring back to FIGS. 15 and 16, by reversing the order of the abovementioned operations, the vehicle frame 10 is reverted back to the first expanded state.

Figure 18:
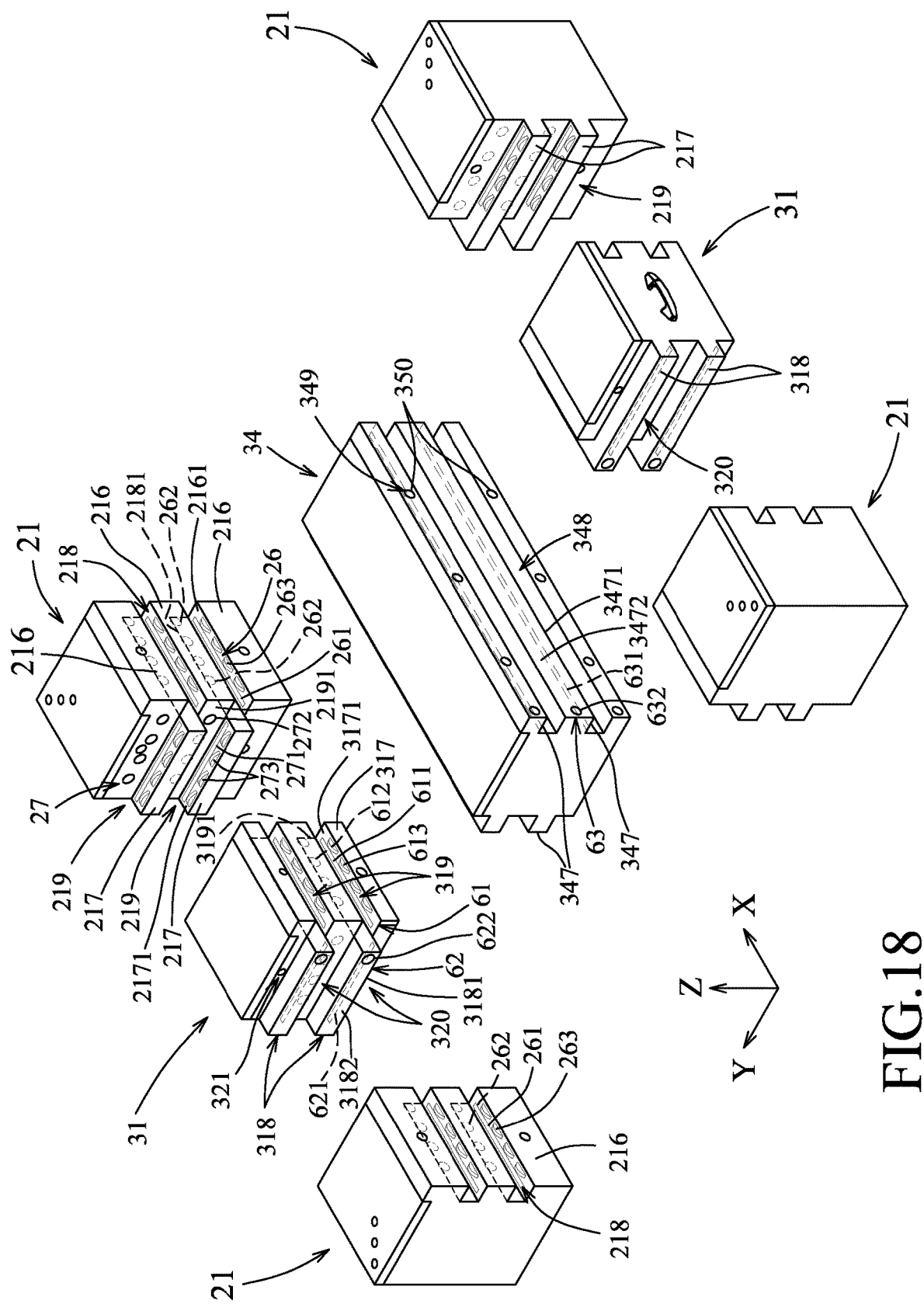
FIG. 18 is an exploded perspective view of a second embodiment of the vehicle chassis.

Referring to FIG. 18, a second embodiment of the vehicle chassis 100 is similar to the first embodiment, with a modification to the movement mechanism of the second and third loading boxes 31, 34.

Each of the first loading boxes 21 further includes a first movement module 26 that is mounted in the first guiding tongues 216 and the first guiding grooves 218, and a second movement module 27 that is mounted in the second guiding tongues 217 and the second guiding grooves 219.

Each of the first movement modules 26 includes a plurality of first horizontal coils 261, a plurality of first vertical coils 262 and plurality of first transport wheels 263. Each of the first horizontal coils 261 extends in the front-rear direction (X), is mounted to and is flush with a top surface 2161 of a corresponding one of the first guiding tongues 216 that is for bearing a corresponding one of the fifth guiding tongues 347. The first vertical coils 262 are circular and are disposed in vertical surfaces 2181 of the first guiding grooves 218. The first vertical coils 262 in each of the first guiding grooves 218 are spaced apart from each other in the front-rear direction (X). The first transport wheels 263 are mounted to the corresponding first guiding tongues 216 that are for bearing the corresponding fifth guiding tongues 347.

The first transport wheels 263 in each of the first guiding tongues 216 are spaced apart in the front-rear direction (X).

Each of the second movement modules 27 includes a plurality of second horizontal coils 271, a plurality of second vertical coils 272 and plurality of second transport wheels 273. Each of the second horizontal coils 271 extends in the lateral direction (Y), is mounted to and is flush with a top surface 2171 of a corresponding one of the second guiding tongues 217 that is for bearing a corresponding one of the fourth guiding tongues 318. The second vertical coils 272 are circular and are disposed in vertical surfaces 2191 of the second guiding grooves 219. The second vertical coils 272 in each of the second guiding grooves 219 are spaced apart from each other in the lateral direction (Y). The second transport wheels 273 are mounted to the corresponding second guiding tongues 217 that are for bearing the corresponding fourth guiding tongues 318. The second transport wheels 273 in each of the second guiding tongues 217 are spaced apart in the lateral direction (Y).

Figure 19:
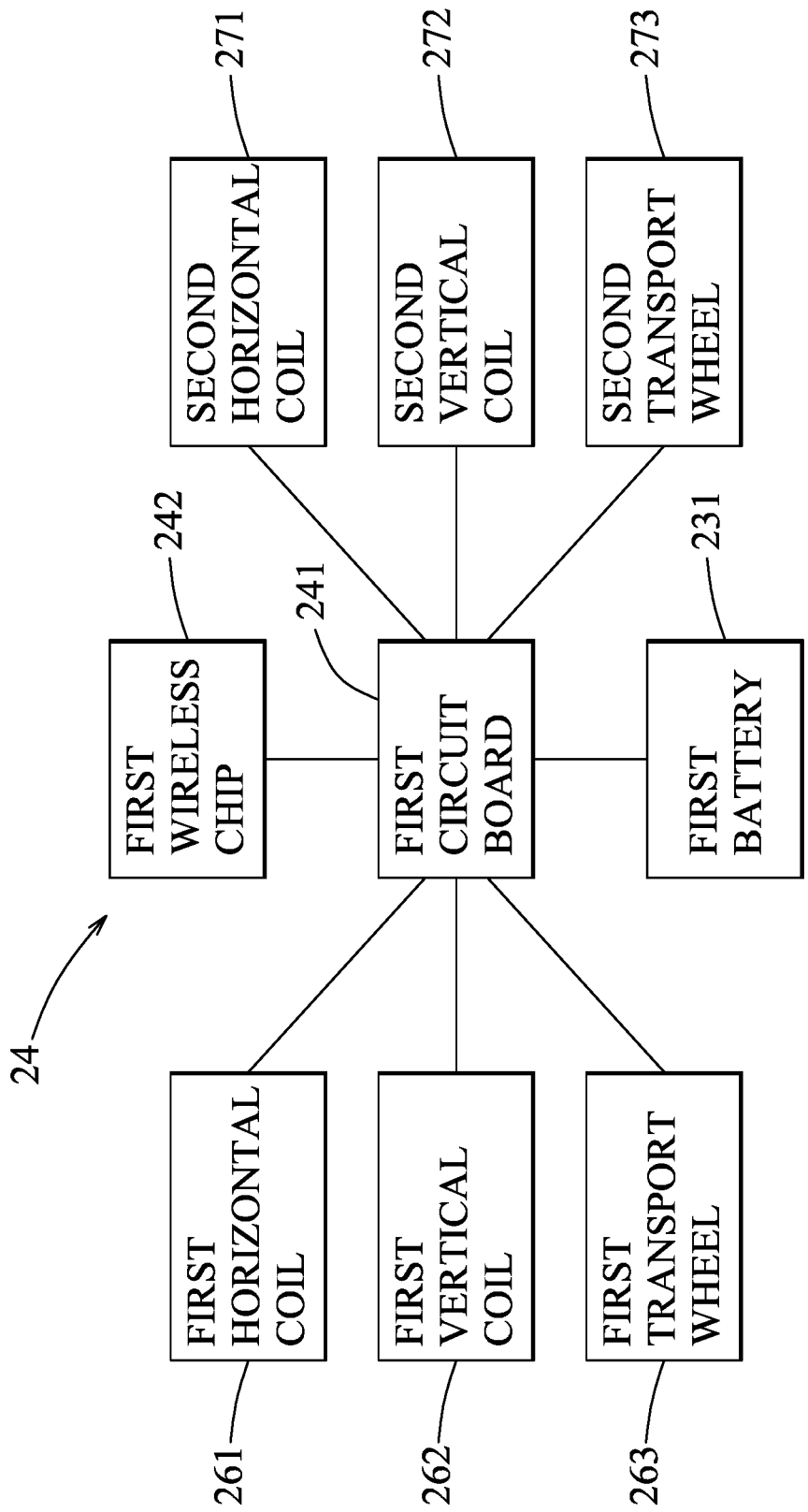
FIG. 19 is a block diagram of the second embodiment, illustrating interconnecting relationship among a first control module, a first movement module and a second movement module.

Referring to FIG. 19, the first circuit board 241 of each of the first control modules 24 is electrically connected to the first and second horizontal coils 261, 271, the first and second vertical coils 262, 272, and the first and second transport wheels 263, 273. The first circuit board 241 of each of the first control modules 24 is operable to power up the first horizontal and vertical coils 261, 262 and the second horizontal and vertical coils 271, 272 for generating magnetic force. The first circuit board 241 of each of the first control modules 24 is also operable to control rotation of the first transport wheels 263 and second transport wheels 273. In the second embodiment, the first control module 24 mounted in one of the first loading boxes 21 acts as the main control module, and sends wireless signals via the first wireless chip 242 to the first wireless chips 242 of the first control modules 24 respectively mounted in the remaining ones of the first loading boxes 21 for controlling the first and second movement modules 26, 27 in the remaining ones of the first loading boxes 21.

Referring back to FIG. 18, each of the second loading boxes 31 further includes a third movement module 61 that is mounted in the third guiding tongues 317 and the third guiding grooves 319, and two fourth movement modules 62 that are disposed respectively at the opposite sides of the second loading boxes 31 and that are mounted in the corresponding fourth guiding tongues 318 and the fourth guiding grooves 320. Each of the third movement modules 61 includes a plurality of third horizontal coils 611, a plurality of third vertical coils 612 and plurality of third transport wheels 613. Each of the third horizontal coils 611 extends in the front-rear direction (X), is mounted to and is flush with a top surface 3171 of a corresponding one of the third guiding tongues 317 that is for bearing a corresponding one of the fifth guiding tongues 347. The third vertical coils 612 are circular and are disposed in vertical surfaces 3191 of the third guiding grooves 319. The third vertical coils 612 in each of the third guiding grooves 319 are spaced apart from each other in the front-rear direction (X). The third transport wheels 613 are mounted to the corresponding third guiding tongues 317 that are for bearing the corresponding fifth guiding tongues 347. The third transport wheels 613 in each of the third guiding tongues 317 are spaced apart in the front-rear direction (X).

Each of the fourth movement modules 62 includes a plurality of fourth horizontal coils 621 and a plurality of fourth vertical coils 622. Each of the fourth horizontal coils 621 extends in the lateral direction (Y), is mounted to and is flush with a bottom surface 3181 of a corresponding one of the fourth guiding tongues 318 that is supported by the second transport wheels 273. Each of the fourth horizontal coils 621 are disposed above a corresponding one of the second horizontal coils 271. Each of the fourth vertical coils 622 is circular, is mounted to a vertical surface 3182 of a corresponding one the fourth guiding tongues 318, and is operable to be registered with one of the second vertical coils 272 in the corresponding second guiding groove 219. In this embodiment, each of the fourth vertical coils 622 is mounted to the corresponding one of the fourth guiding tongues 318 at an end thereof proximate to the third guiding grooves 319.

Figure 20:
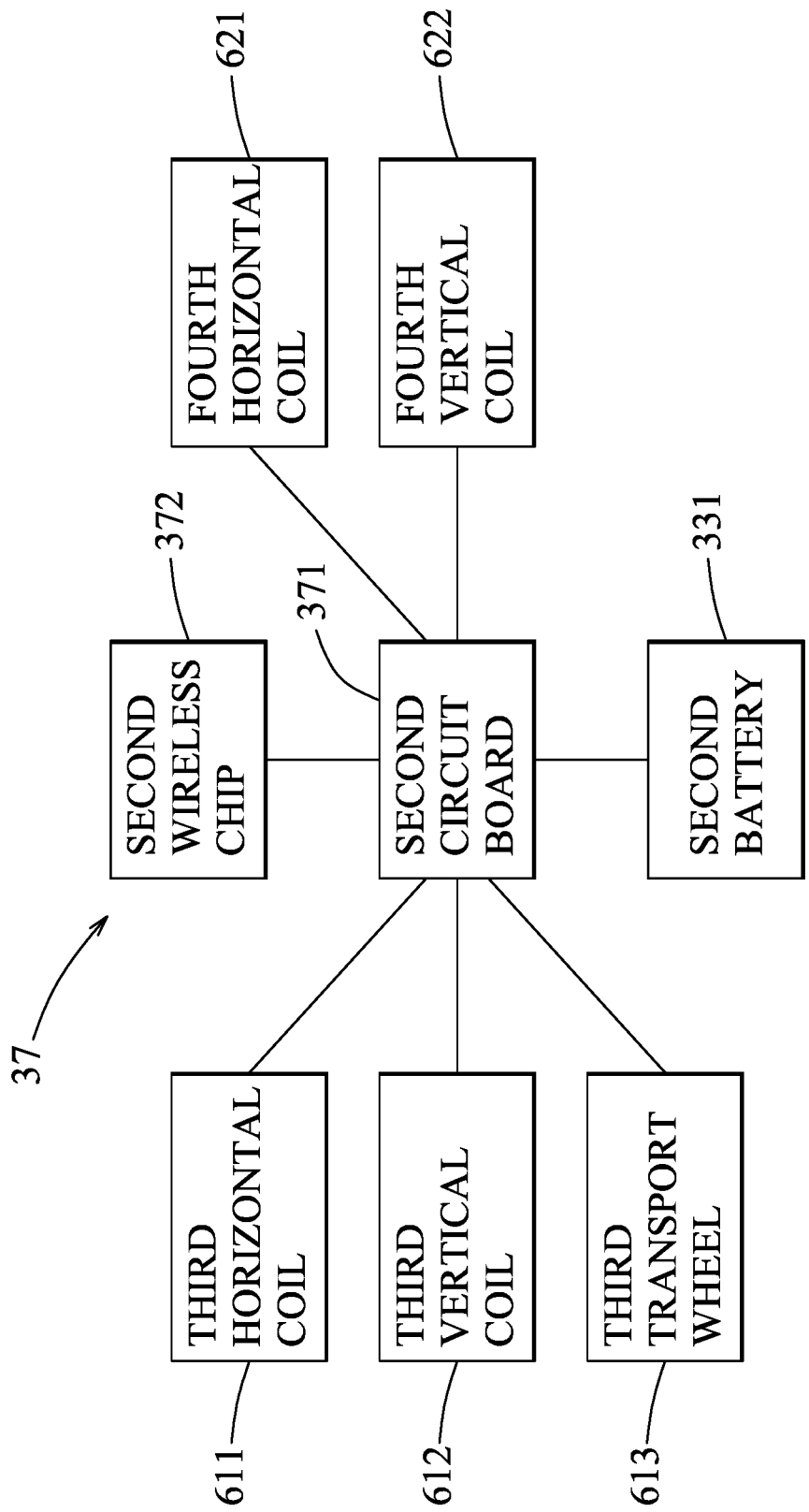
FIG. 20 is a block diagram of the second embodiment, illustrating interconnecting relationship among a second control module, a third movement module and a fourth movement module.

Referring to FIG. 20, the second circuit board 371 of each of the second control modules 37 is electrically connected to the third and fourth horizontal coils 611, 612, the third and fourth vertical coils 621, 622, and the third transport wheels 613. The second circuit board 371 of each of the second control modules 37 is operable to power up the third horizontal and vertical coils 611, 612 and the fourth horizontal and vertical coils 621, 622 for generating magnetic force. The second circuit board 371 of each of the second control modules 37 is also operable to control rotation of the third transport wheels 613. In the second embodiment, the first control module 24 that acted as the main control module sends wireless signals via the first wireless chip 242 (see FIG. 19) to the second wireless chips 372 of the second control modules 37 respectively mounted in the second loading boxes 31 for controlling the third and fourth movement modules 61, 62 in the second loading boxes 31.

Referring back to FIG. 18, the third loading box 34 further includes two fifth movement modules 63 that are disposed respectively at the opposite sides of the third loading box 34 and that are mounted in the corresponding fifth guiding tongues 347 and fifth guiding grooves 348. Each of the fifth movement modules 63 includes a plurality of fifth horizontal coils 631 and a plurality of fifth vertical coils 632. Each of the fifth horizontal coils 631 extends in the front-rear direction (X), is mounted to and is flush with a bottom surface 3471 of a corresponding one of the fifth guiding tongues 347 that is supported by the first and third transport wheels 263, 613. Each of the fifth horizontal coils 631 are disposed above corresponding ones of the first and third horizontal coils 261, 611. Each of the fifth vertical coils 632 is circular, is mounted to vertical surfaces 3472 of a corresponding one the fifth guiding tongues 347, and is operable to be registered with one of the first vertical coils 262 in the first guiding grooves 218. In this embodiment, each of the fifth vertical coils 632 is mounted to the corresponding one of the fifth guiding tongues 218 at an end thereof distal from the second handle 344 (see FIG. 3).

Figure 21:
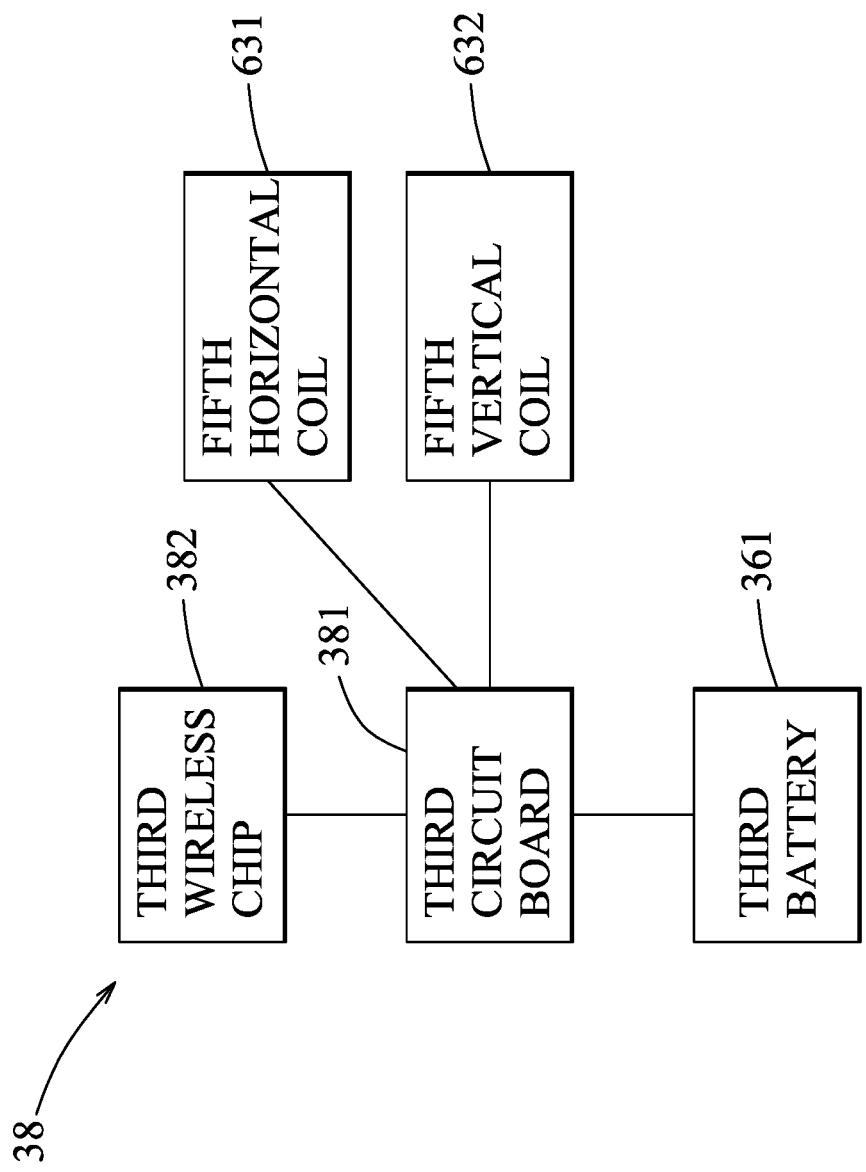
FIG. 21 is a block diagram of the second embodiment, illustrating interconnecting relationship between a third control module and a fifth movement module.
Figure 22:
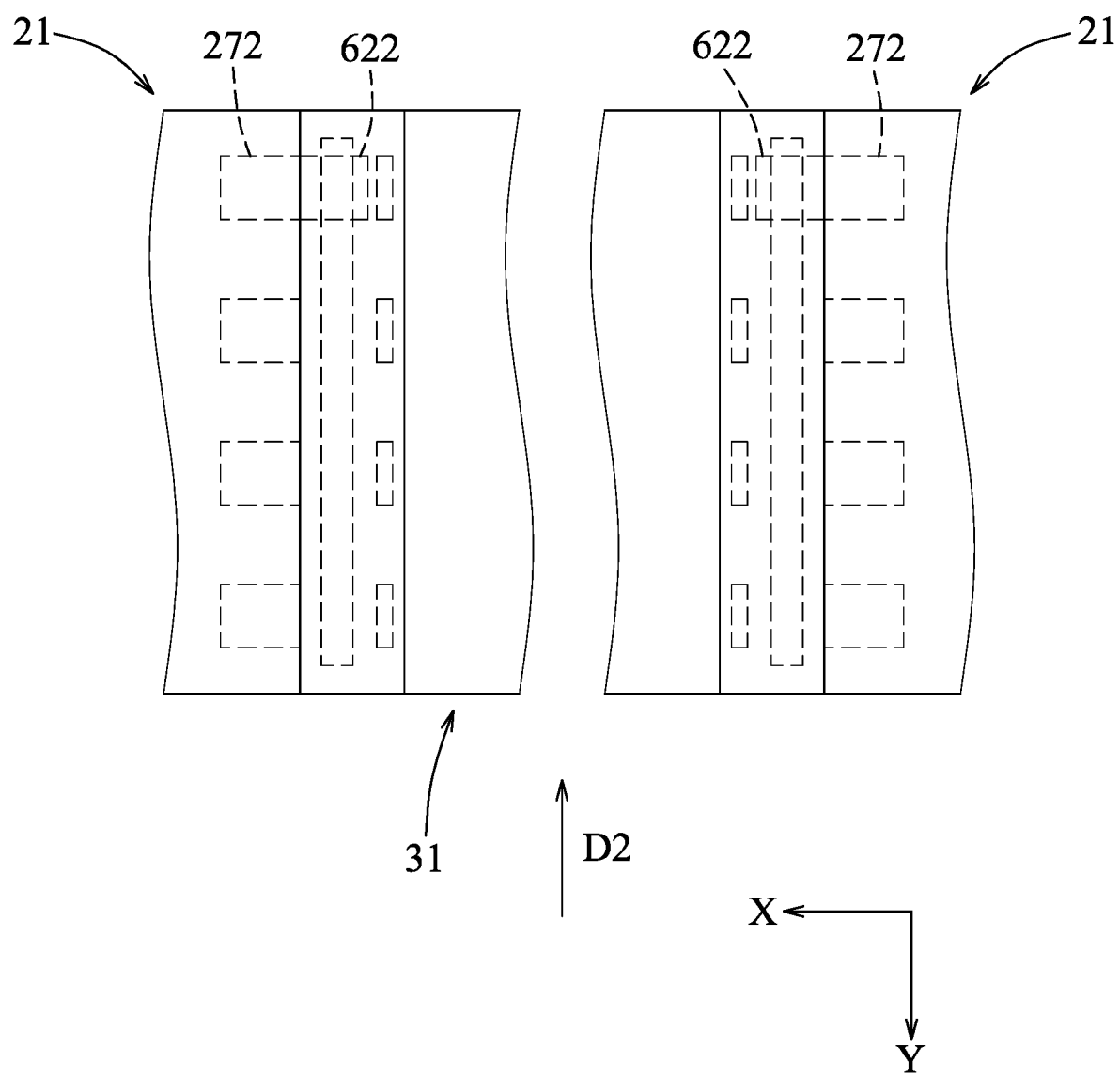
FIG. 22 is a fragmentary top view of the second embodiment, illustrating one of the second loading boxes being assembled between corresponding two of the first loading boxes.
Figure 23:
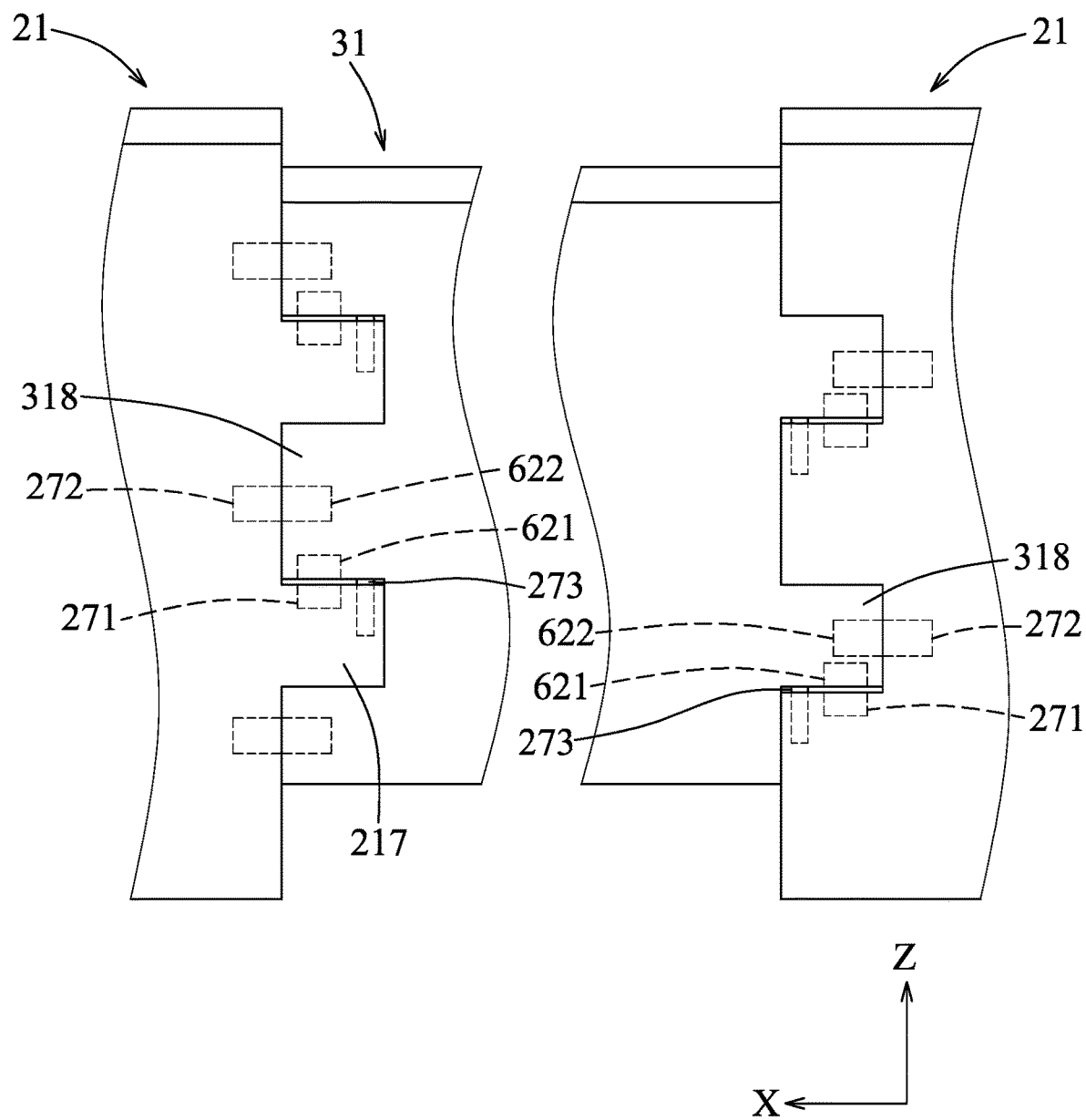
FIG. 23 is a fragmentary side view of the second embodiment, illustrating the one of the second loading boxes being assembled between the corresponding two of the first loading boxes.
Figure 24:
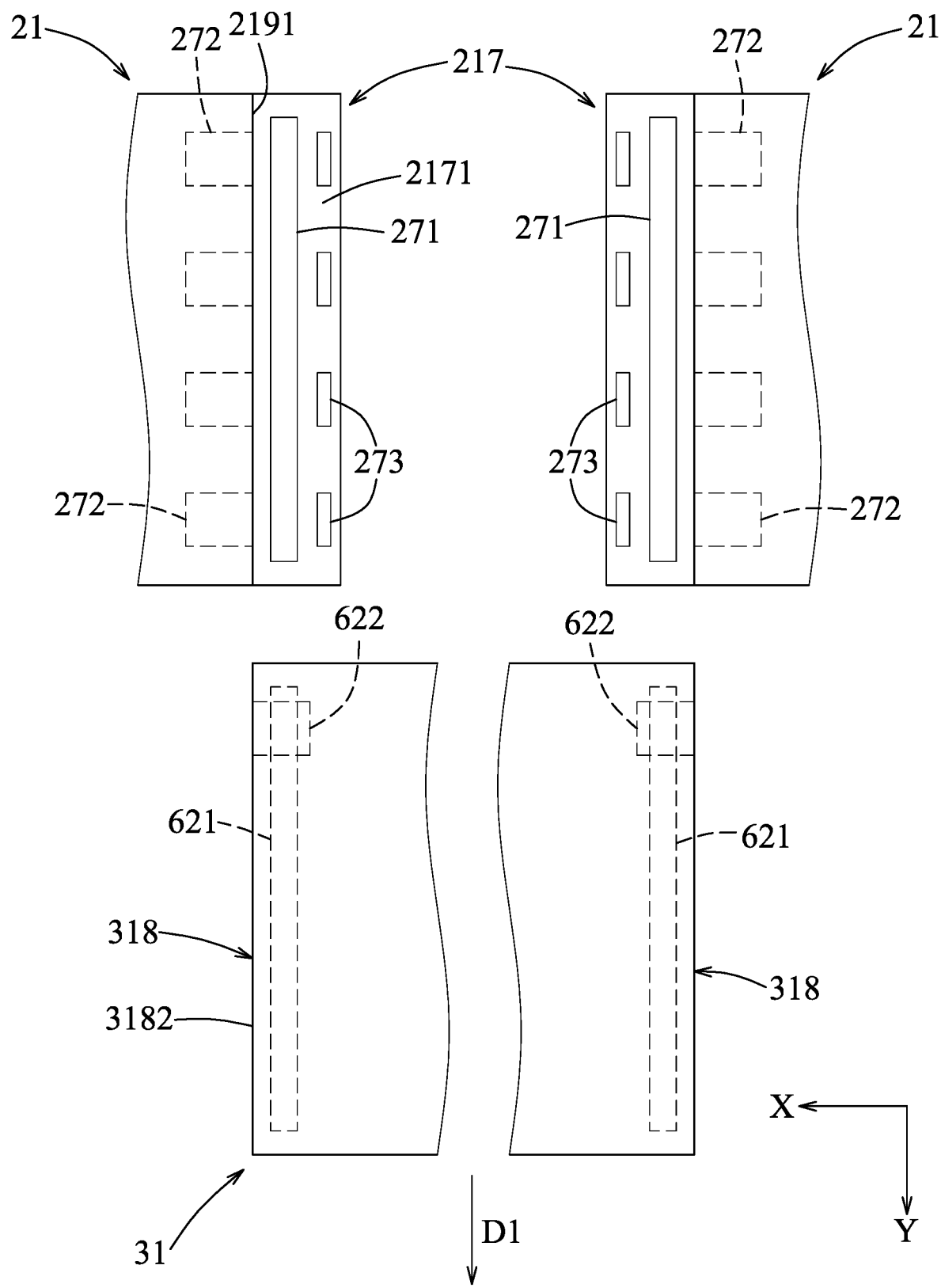
FIG. 24 is a fragmentary top view of the second embodiment, illustrating the one of the second loading boxes being uncoupled from the corresponding two of the first loading boxes.

Referring to FIG. 21, the third circuit board 381 of each of the third control modules 38 is electrically connected to the fifth horizontal and vertical coils 631, 632. The third circuit board 381 of each of the third control modules 38 is operable to power up the fifth horizontal and vertical coils 631, 632 for generating magnetic force. In the second embodiment, the first control module 24 that acted as the main control module sends wireless signals via the first wireless chip 242 (see FIG. 19) to the third wireless chips 382 of the third control modules 38 mounted in the third loading boxes 34 for controlling the fifth movement module 63 in the third loading box 34.

Referring to FIGS. 19, 20, and 22 to 24, if the user wishes to uncouple one of the second loading boxes 31, the user may simply send a transmission signal to the first control module 24 that acted as the main control module via the communication device to facilitate the uncoupling process.

After the first wireless chip 242 of the main control module received the signal, the main control module signals the first control modules 24 of the corresponding two of the first loading boxes 21 to power up the second horizontal coils 271 for generating the magnetic force, to power up the second vertical coils 272 abruptly and sequentially in an outward direction, and to power up the second transport wheels 273 to rotate, with top end thereof moving outwardly. In addition, the main control module further powers up the fourth horizontal and vertical coils 621, 622 of the second loading box 31 to generate magnetic force.

After being powered up, the second and fourth horizontal coils 271, 621 have the same polarity, which generates repelling magnetic force for lifting the fourth guiding tongues 318 to slide easily, and the second and fourth vertical coils 272, 626 have opposite polarities, which generates attracting magnetic force therebetween for pulling the second loading box 31 in the outward direction. By combining the magnetic forces with the rotation of the second transport wheels 273, the fourth guiding tongues 318 of the second loading box 31 are driven to move outwardly, such that the second loading box 31 is automatically pushed outwardly for the user to access. By reversing the order of the abovementioned operations, the second loading box 31 is reverted to be coupled between the corresponding two of the first loading boxes 21 again.

Referring to FIGS. 18 to 21, if the user wishes to uncouple the third loading box 34, the user would perform abovementioned operations in a similar fashion. Specifically, after the first wireless chip 242 of the main control module received the signal to uncouple the third loading box 34, the main control module signals the first control modules 24 of the first loading boxes 21 to power up the first horizontal coils 261 for generating the magnetic force, to power up the first vertical coils 272 abruptly and sequentially in a forward direction, and to power up the first transport wheels 273 to rotate, with top end thereof moving forwardly. The main control module also signals the second control modules 37 of the second loading boxes 31 to power up the third horizontal coils 611 for generating the magnetic force, to power up the third vertical coils 612 abruptly and sequentially in a forward direction, and to power up the third transport wheels 613 to rotate, with top end thereof moving forwardly. In addition, the main control module further powers up the fifth horizontal and vertical coils 631, 632 of the third loading box 34 to generate magnetic force.

After being powered up, the first, third and fifth horizontal coils horizontal coils 261, 611, 631 have the same polarity, which generates repelling magnetic force for lifting the third guiding tongues 347 to slide easily, and the first and third vertical coils 262, 612 have polarity opposite to that of the fifth vertical coils 632, which generates attracting magnetic force thereamong for pulling the third loading box 34 in the outward direction. By combining the magnetic forces with the rotation of the third transport wheels 613, the fifth guiding tongues 347 of the third loading box 34 are driven to move outwardly, such that the third loading box 34 is automatically pushed outwardly for the user to access. By reversing the order of the abovementioned operations, the third loading box 34 is reverted to be coupled among the first and second loading boxes 21, 31 again.

Figure 26:
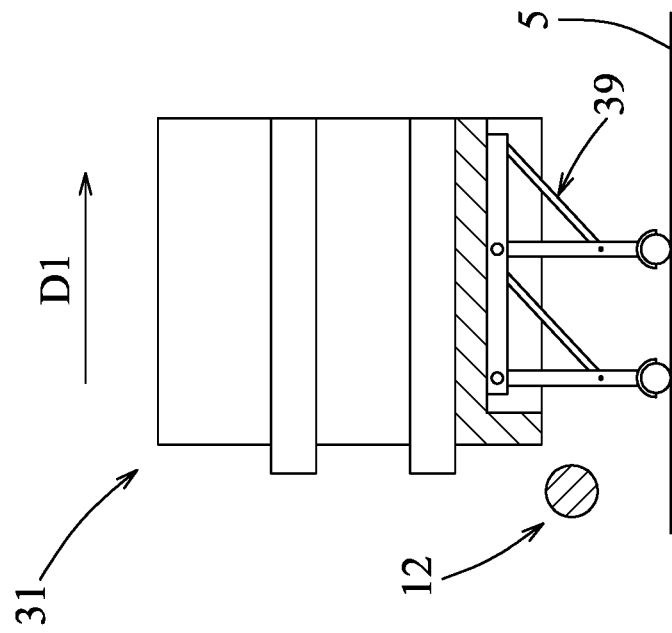
FIG. 26 is a side view the one of the second loading boxes of the second embodiment, illustrating the guiding frame in an expanded state.
Figure 25:
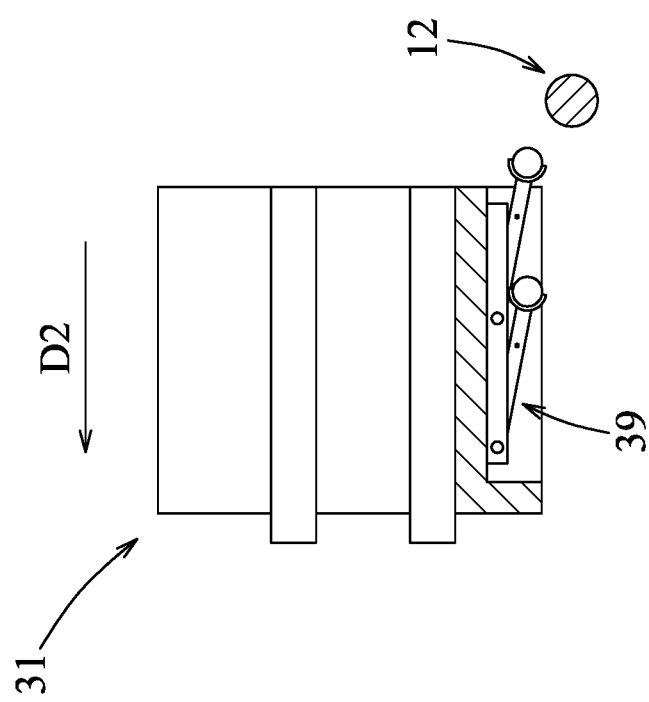
FIG. 25 is a side view of the one of the second loading boxes of the second embodiment, illustrating a guiding frame in a collapsed state.

Referring to FIGS. 18, 25 and 26, the second loading assembly 3 further includes three collapsible guiding frames 39 (only one is shown) that are respectively mounted at bottom surfaces of the second and third loading boxes 31, 34. The guiding frames 39 are operable to switch from a collapsed state (see FIG. 25) to an expanded state (see FIG. 26) when at least one of the second and third loading boxes 31, 34 is pulled (via D1) to be uncoupled from the first loading boxes 21 for providing roller movement and weight support thereto against the ground 5. When the at least one of the second and third loading boxes 31, 34 is pushed (via D2) to be recoupled to the first loading boxes 21, the guiding frames 39 would be pushed by the telescopic rods 12 to rotate relative to the bottom surfaces, reverting back from the expanded state to the collapsed state if they were initially in the expanded state.

Overall, by operating the vehicle frame 10 to switch between the various states disclosed above and by the design of the first and second loading assemblies 2, 3, the electric chassis 100 of the embodiments is suitable for use in different driving circumstances. In addition, the design for uncoupling the second and third loading boxes 31, 34 from the first loading boxes 21 through the openings of the vehicle frame 10 provides easier access thereto for replacement and repair of the batteries therein.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vehicle chassis (100) comprising:
   a vehicle frame (10) defining an inner space (15) and being operable to switch between a first expanded state and a collapsed state; and
   a loading device (20) mounted to said inner space (15) and removably connected to said vehicle frame (10), said loading device (20) defining a first loading surface (201) when said vehicle frame (10) is in the first expanded state, and said loading device (20) defining a second loading surface (202) that is smaller than said first loading surface (201) when said vehicle frame (10) is in the collapsed state;
   wherein said loading device (20) includes a first loading assembly (2) that is to be removably connected to said vehicle frame (10), and a second loading assembly (3) that is to be removably coupled to said first loading assembly (2);
   wherein, when said vehicle frame (10) is in the first expanded state, said first loading assembly (2) is in a separated state, and defines a mounting space (25) for said second loading assembly (3) to be mounted thereto and to be coupled to said first loading assembly (2), and said second loading assembly (3) cooperates with said first loading assembly (2) to define said first loading surface (201); and wherein, when said vehicle frame (10) is in the collapsed state, said second loading assembly (3) is separated from said first loading assembly (2), and said first loading assembly (2) is in an assembled state and defines said second loading surface (202).

2. The vehicle chassis (100) as claimed in claim 1, wherein:

said first loading assembly (2) includes a plurality of first loading boxes (21) removably connected to said vehicle frame (10), and a plurality of first battery modules (23) removably and respectively disposed in said first loading boxes (21), each of said first loading boxes (21) being permitted to be removably coupled to adjacent ones of said first loading boxes (21);

when said first loading assembly (2) is in the separated state, said first loading boxes (21) are spaced apart from each other to define said mounting space (25) theramong; and when said first loading assembly (2) is in the assembled state, said first loading boxes (21) are coupled to each other to cooperatively define said second loading surface (202).

3. The vehicle chassis (100) as claimed in claim 2, wherein:

said vehicle frame (10) is permitted to be telescopic in at least a front-rear direction (X);

said vehicle frame (10) is formed with at least one lateral opening (16) that is registered with said mounting space (25);

said second loading assembly (3) includes at least one second loading box (31) and at least one second battery module (33) removably disposed in said at least one second loading box (31), said at least one second loading box (31) being permitted to be removably coupled between corresponding two of said first loading boxes (21); and when said vehicle frame (10) is in the first expanded state, said second loading box (31) is permitted to be uncoupled from said first loading boxes (21) in a lateral direction (Y) perpendicular to the front-rear direction (X) through said lateral opening (16).

4. The vehicle chassis (100) as claimed in claim 3, wherein:

said vehicle frame (10) is formed with two of said lateral openings (16) respectively at two opposite sides thereof, said lateral openings (16) being spaced apart in the lateral direction (Y);

said second loading assembly (3) includes two of said second loading boxes (31) and two of said second battery modules (33) removably and respectively disposed in said second loading boxes (31); and when said vehicle frame (10) is in the first expanded state, each of said second loading boxes (31) is permitted to be respectively uncoupled from corresponding two of said first loading boxes (21) through a respective one of said lateral openings (16).

5. The vehicle chassis (100) as claimed in claim 4, wherein:

said vehicle frame (10) is telescopic in the front-rear direction (X) and the lateral direction (Y), such that said vehicle frame (10) is operable to switch between the first expanded state and the collapsed state;

said vehicle frame (10) is substantially rectangular, includes four casing members (11) respectively disposed at four corners of said vehicle frame (10), and is further formed with an end opening (17) that is permitted to be registered to said mounting space (25);

said first loading assembly (2) includes four of said first loading boxes (21) removably and respectively connected to said casing members (11);

said second loading assembly (3) further includes a third loading box (34) and at least one third battery module (36) removably disposed in said third loading box (34), said third loading box (34) being permitted to be removably coupled among said first loading boxes (21) and said second loading boxes (31); and when said vehicle frame (10) is in the first expanded state, said first, second and third loading boxes (21, 31, 34) cooperatively define said first loading surface (201), and said third loading box (34) is permitted to be uncoupled from said first and second loading boxes (21, 31) in the front-rear direction (X) through said end opening (17).

6. The vehicle chassis (100) as claimed in claim 5, wherein:

said first, second and third battery modules (23, 33, 36) are electrically connected to each other in parallel when said vehicle frame (10) is in the first expanded state; and said first battery modules (23) are electrically connected to each other in parallel when said vehicle frame (10) is in the collapsed state.

7. The vehicle chassis (100) as claimed in claim 6, wherein:

each of said first loading boxes (21) includes two first through hole units (222), each of said first battery modules (23) including two first electrode units (232) that respectively extend through said first through hole units (222);

each of said second loading boxes (31) includes three second through hole units (321), each of said second battery modules (33) including three second electrode units (332) that respectively extend through said second through hole units (321);

said third loading box (34) includes six third through hole units (349), said second loading assembly (3) including three of said third battery modules (36) that are removably disposed in said third loading box (34), each of said third battery modules (36) including two third electrode units (362) that respectively extend through corresponding two of said third through hole units (349); and when said vehicle frame (10) is in the first expanded state, each of said third electrode units (362) of one of said third battery modules (36) is electrically connected to one of said second electrode units (332) of a respective one of said second battery modules (33), each of said third electrode units (362) of the remaining two of said third battery modules (36) is electrically connected to a corresponding one of said first electrode units (232), and the remaining two of said second electrode units (332) of each of said second battery modules (33) are respectively and electrically connected to the corresponding first electrode units (232).

8. The vehicle chassis (100) as claimed in claim 5, wherein:

each of said first loading boxes (21) includes a plurality of first guiding tongues (216) extending in the front-rear direction (X), and a plurality of second guiding tongues (217) extending in the lateral direction (Y), said first guiding tongues (216) being spaced apart from each other in an up-down direction (Z) perpendicular to both the front-rear direction (X) and the lateral direction (Y) to define a plurality of first guiding grooves (218), and said second guiding tongues (217) being spaced apart from each other in the up-down direction (Z) to define a plurality of second guiding grooves (219);

each of said second loading boxes (31) includes a plurality of third guiding tongues (317) extending in the front-rear direction (X) and being spaced apart in the up-down direction (Z) to define a plurality of third guiding grooves (319), and a plurality of fourth guiding tongues (318) extending in the lateral direction (Y) and disposed at two opposite sides of said second loading box (31) in such a manner that said fourth guiding tongues (318) at each side of said second loading box (31) are spaced apart in the up-down direction (Z) to define a plurality of fourth guiding grooves (320);

said third loading box (34) includes a plurality of fifth guiding tongues (347) extending in the front-rear direction (X) and disposed at two opposite sides of said third loading box (34) in such a manner that said fifth guiding tongues (347) at each side of said third loading box (34) are spaced apart in the up-down direction (Z) to define a plurality of fifth guiding grooves (348); and each of said first and third guiding tongues (216, 317) is permitted to be sildably connected to a corresponding one of said fifth guiding grooves (348), each of said second guiding tongues (217) is permitted to be slidably connected to a corresponding one of said fourth guiding grooves (320), each of said fourth guiding tongues (318) is permitted to be slidably connected to a corresponding one of said second guiding grooves (219), and each of said fifth guiding tongues (347) is permitted to be slidably connected to corresponding ones of said first and third guiding grooves (218, 319).

9. The vehicle chassis (100) as claimed in claim 8, wherein:

each of said first loading boxes (21) further includes a first movement module (26) that is mounted in said first guiding tongues (216) and said first guiding grooves (218), and a second movement module (27) that is mounted in said second guiding tongues (217) and said second guiding grooves (219);

each of said second loading boxes (31) further includes a third movement module (61) that is mounted in said third guiding tongues (317) and said third guiding grooves (319), and two fourth movement modules (62) that are disposed respectively at the opposite sides of said second loading boxes (31) and that are mounted in said corresponding fourth guiding tongues (318) and fourth guiding grooves (320), each of said fourth movement modules (62) being permitted to cooperate with said corresponding second movement module (27) to co-facilitate movement of each of said second loading boxes (31) relative to the corresponding two of said first loading boxes (21) in the lateral direction (Y); and said third loading box (34) further includes two fifth movement modules (63) that are disposed respectively at the opposite sides of said third loading box (34) and that are mounted in said corresponding fifth guiding tongues (347) and fifth guiding grooves (348), each of said fifth movement modules (63) being permitted to cooperate with said corresponding first and third movement modules (26, 61) to co-facilitate movement of said third loading box (34) relative to said first and second loading boxes (21, 31) in the front-rear direction (X).

10. The vehicle chassis (100) as claimed in claim 9, wherein:

each of said first movement modules (26) of said first loading boxes (21) includes a plurality of first horizontal coils (261) and a plurality of first vertical coils (262), each of said first horizontal coils (261) being mounted to a corresponding one of said first guiding tongues (216) that is for bearing a corresponding one of said fifth guiding tongues (347), said first vertical coils (262) being disposed in said first guiding grooves (218), and said first vertical coils (262) in each of said first guiding grooves (218) being spaced apart from each other in the front-rear direction (X);

each of said second movement modules (27) of said first loading boxes (21) includes a plurality of second horizontal coils (271) and a plurality of second vertical coils (272), each of said second horizontal coils (271) being mounted to a corresponding one of said second guiding tongues (217) that is for bearing a corresponding one of said fourth guiding tongues (318), said second vertical coils (272) being disposed in said second guiding grooves (219), and said second vertical coils (272) in each of said second guiding grooves (219) being spaced apart from each other in the lateral direction (Y);

each of said third movement modules (61) of said second loading boxes (31) includes a plurality of third horizontal coils (611) and a plurality of third vertical coils (612), each of said third horizontal coils (611) being mounted to a corresponding one of said third guiding tongues (317) that is for bearing a corresponding one of said fifth guiding tongues (347), said third vertical coils (612) being disposed in said third guiding grooves (319), and said third vertical coils (612) in each of said third guiding grooves (319) being spaced apart from each other in the front-rear direction (X);

each of said fourth movement modules (62) of said second loading boxes (31) includes a plurality of fourth horizontal coils (621) and a plurality of fourth vertical coils (622), each of said fourth horizontal coils (621) and each of said fourth vertical coils (622) being mounted to a corresponding one of said fourth guiding tongues (318), each of said fourth horizontal coils (621) being disposed above a corresponding one of said second horizontal coils (271), and each of said fourth vertical coils (622) being operable to be registered with one of said second vertical coils (272) in said second guiding grooves (219);

each of said fifth movement modules (63) includes a plurality of fifth horizontal coils (631) and a plurality of fifth vertical coils (632), each of said fifth horizontal coils (631) and each of said fifth vertical coils (632) being mounted to a corresponding one of said fifth guiding tongues (347), each of said fifth horizontal coils (631) being disposed above corresponding ones of said first and third horizontal coils (261, 611), and each of said fifth vertical coils (632) being operable to be registered with one of said first vertical coils (262) in said first guiding grooves (218);

said first loading assembly (2) further includes a plurality of first control modules (24) respectively assembled in said first loading boxes (21), each of said first control modules (24) being operable to power up said first horizontal and vertical coils (261, 262) and said second horizontal and vertical coils (271, 272) for generating magnetic force;

said second loading assembly (3) further includes two second control modules (37) respectively assembled in said second loading boxes (31) and a third control module (38) assembled in said third loading box (34), each of said second control modules (37) being operable to power up said third horizontal and vertical coils (611, 612) and said fourth horizontal and vertical coils (621, 622) for generating magnetic force, and said third control module (38) being operable to power up said fifth horizontal and vertical coils (631, 632) for generating magnetic force; and after being powered up, said first, third and fifth horizontal coils (261, 611, 631) have the same polarity, said second and fourth horizontal coils (271, 621) have the same polarity, said first and third vertical coils (262, 612) have polarity opposite to that of said fifth vertical coils (632), and said second vertical coils (272) have polarity opposite to that of said fourth vertical coils (626).

11. The vehicle chassis (100) as claimed in claim 10, wherein:

each of said first movement modules (26) further includes a plurality of first transport wheels (263) that are mounted to said corresponding first guiding tongues (216) for bearing said corresponding fifth guiding tongues (347);

each of said second movement modules (27) further includes a plurality of second transport wheels (273) that are mounted to said corresponding second guiding tongues (217) for bearing said corresponding fourth guiding tongues (318);

each of said third movement modules (61) further includes a plurality of third transport wheels (613) that are mounted to said corresponding third guiding tongues (317) for bearing said corresponding fifth guiding tongues (347); and each of said first control modules (24) is operable to control movement of said fifth guiding tongues (347) via rotation of said first transport wheels (263) and to control movement of said fourth guiding tongues (318) via rotation of said second transport wheels (273), and each of said second control modules (37) is operable to control movement of said fifth guiding tongues (347) via rotation of said third transport wheels (613).

12. The vehicle chassis (100) as claimed in claim 5, wherein:

said vehicle frame (10) further includes four pairs of telescopic rods (12), each pair of which fixedly interconnects corresponding two of said casing members (11);

two pairs of said telescopic rods (12) are spaced apart in the lateral direction (Y), are telescopic in the front-rear direction (X), and respectively define two of said lateral openings (16); and the other two pairs of said telescopic rods (12) are spaced apart in the front-rear direction (X), are telescopic in the lateral direction (Y), one of which defines said end opening (17).

13. The vehicle chassis (100) as claimed in claim 5, further comprising a lifting device (40), wherein:

said vehicle frame (10) further includes four wheels (13) respectively connected to said casing members (11) and permitted to be in contact with ground;

said lifting device (40) is for lifting said vehicle frame (10) such that said wheels (13) are not permitted to be in contact with the ground, and includes four jacks (43) respectively mounted to said casing members (11), each of said jacks having a jack main body (431) and a top strut (432) that telescopically extends from a bottom of said jack main body (431) and that has a contact member (433) disposed at a bottom thereof, said contact member (433) being a freely-rotatable ball; and said top strut (432) is operable to move between a base position, where said contact member (433) is disposed higher than bottom of said wheels (13), and an extended position, where said contact member (433) is disposed lower than the bottom of said wheels (13).

14. The vehicle chassis (100) as claimed in claim 1, wherein said vehicle frame is operable to be further switched to a second expanded state, in which said loading device (20) defines a third loading surface (203) that is smaller than said first loading surface (201) and that is larger than said second loading surface (202).

15. The vehicle chassis (100) as claimed in claim 14, wherein:

said loading device (20) includes four first loading boxes (21) removably connected to said vehicle frame (10), and two second loading boxes (31);

said first loading boxes (21) are permitted to be removably coupled to each other to define said second loading surface (202), and each of said second loading boxes (31) is permitted to be removably coupled between corresponding two of said first loading boxes (21);

when said vehicle frame (10) is in the second expanded state, each of said second loading boxes (31) is removably coupled to each other and between the corresponding two of said first loading boxes (21) to cooperatively define said third loading surface (203); and when said vehicle frame (10) is in the collapsed state, each of said second loading boxes (31) is separated from each other and from the corresponding two of said first loading boxes (21).

* * * * *